United States Patent
Sheng et al.

(10) Patent No.: US 10,805,863 B2
(45) Date of Patent: Oct. 13, 2020

(54) METHOD AND APPARATUS FOR GENERATING AND USING REFERENCE SIGNAL FOR BROADCAST CHANNEL FOR RADIO SYSTEM

(71) Applicants: Sharp Kabushiki Kaisha, Sakai, Osaka OT (JP); FG Innovation Company Limited, Tuen Mun, New Territories, Hong Kong (CN)

(72) Inventors: Jia Sheng, Vancouver, WA (US); Tatsushi Aiba, Vancouver, WA (US); Toshizo Nogami, Chiba (JP)

(73) Assignees: SHARP KABUSHIKI KAISHA, Sakai, Osaka (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 16/009,704

(22) Filed: Jun. 15, 2018

(65) Prior Publication Data

US 2018/0368054 A1    Dec. 20, 2018

Related U.S. Application Data

(60) Provisional application No. 62/520,434, filed on Jun. 15, 2017.

(51) Int. Cl.
*H04W 72/00* (2009.01)
*H04W 48/10* (2009.01)
(Continued)

(52) U.S. Cl.
CPC .......... *H04W 48/10* (2013.01); *H04L 5/0048* (2013.01); *H04L 5/0051* (2013.01); *H04W 56/001* (2013.01); *H04W 72/005* (2013.01)

(58) Field of Classification Search
CPC .................................................. H04W 72/04
See application file for complete search history.

(56) References Cited

U.S. PATENT DOCUMENTS

| | | | |
|---|---|---|---|
| 8,917,618 B2 * | 12/2014 | Chatterjee | H04B 7/0639 370/252 |
| 2011/0038344 A1 * | 2/2011 | Chmiel | H04L 5/0051 370/330 |

(Continued)

FOREIGN PATENT DOCUMENTS

| | | |
|---|---|---|
| CN | 108989003 A | 12/2018 |
| WO | WO 2012/130180 A1 | 10/2012 |

OTHER PUBLICATIONS

International Search Report and Written Opinion dated Sep. 6, 2018 in PCT application PCT/US2018/37755.

(Continued)

*Primary Examiner* — Fahmida S Chowdhury
(74) *Attorney, Agent, or Firm* — ScienBiziP, P.C.

(57) ABSTRACT

A node of a radio access network comprises processor circuitry (30) and transmitter circuitry (34). The processor circuitry (30) generates a synchronization signal block comprising a Physical Broadcast Channel (PBCH) and a demodulation reference signal for the Physical Broadcast Channel (PBCH) from which demodulation reference signal a parameter of the radio access network can be determined. The transmitter circuitry transmits the synchronization signal block and the demodulation reference signal over a radio interface (24).

4 Claims, 13 Drawing Sheets

(51) Int. Cl.
*H04W 56/00* (2009.01)
*H04L 5/00* (2006.01)

(56) References Cited

U.S. PATENT DOCUMENTS

| | | | |
|---|---|---|---|
| 2013/0235821 A1* | 9/2013 | Chen | H04W 48/20 370/329 |
| 2014/0198747 A1* | 7/2014 | Ouchi | H04L 5/0053 370/329 |
| 2014/0301305 A1 | 10/2014 | Xu et al. | |
| 2014/0341180 A1 | 11/2014 | Liu et al. | |
| 2015/0036525 A1* | 2/2015 | Aiba | H04B 1/7103 370/252 |
| 2015/0223216 A1* | 8/2015 | Han | H04W 72/044 370/329 |
| 2015/0249526 A1* | 9/2015 | Kim | H04L 5/0051 370/329 |
| 2017/0280469 A1* | 9/2017 | Park | H04W 76/14 |
| 2018/0198659 A1* | 7/2018 | Ko | H04L 5/005 |
| 2018/0324720 A1* | 11/2018 | Ly | H04W 56/001 |
| 2018/0324732 A1* | 11/2018 | Park | H04W 56/0015 |
| 2019/0261315 A1* | 8/2019 | Zhang | H04J 11/0069 |
| 2020/0099500 A1 | 3/2020 | Huang et al. | |

OTHER PUBLICATIONS

3GPP TSG RAN WG1 Meeting NR Ad-Hoc, "RAN1 Chairman's Notes", Spokane, USA, Jan. 16-20, 2017.
R2-1706160, 3GPP TSG RAN WG2 Meeting #98, "Response LS on reading time index indication for RRM measurements", Hangzhou, P.R China, May 15-19, 2017.
RP-161596, 3GPP TSG RAN Meeting #73, NTT DOCOMO, "Revision of SI: Study on New Radio Access Technology", New Orleans, Sep. 19-22, 2016.
3GPP TSG RAN WG1 Meeting #86, RAN1 Chairman's Notes, Gothenburg, Sweden, Aug. 22-26, 2016.
3GPP TSG RAN WG1 Meeting #87, RAN1 Chairman's Notes, Reno, USA, Nov. 14-18, 2016.
R1-1610522, 3GPP TSG RAN WG1 Meeting #86b, Intel Corporation, NTT DOCOMO, ZTE, ZTE Microelectronics, ETRI, InterDigital, "WF on the unified structure of DL sync signal", Lisbon, Portugal, Oct. 10-14, 2016.
R1-1611268, 3GPP TSG RAN WG1 Meeting #87, ZTE, ZTE Microelectronics, "Considerations on SS block design", Reno, USA, Nov. 14-18, 2016.
R2-17xxxx, 3GPP TSG-RAN WG2 Meeting #98, RAN2 May 2017 Chairman (Intel), Proposed Agenda, Hangzhou, China, May 15-19, 2017.
R1-1704361, "NR-PBCH Design", ZTE, ZTE Microelectronics, 3GPP TSG RAN WG1 Meeting #88bis, Spokane, USA Apr. 3-7, 2017, pp. 1-9.
R1-1707590, "NR-PBCH Design", LG Electronics, 3GPP TSG RAN WG1 Meeting #89, Hangzhou, P.R. China May 15-19, 2017, p. 1-14.
R1-1708439, "Discussion and evaluation on NR-PBCH design", NTT DOCOMO, Inc., 3GPP TSG RAN WG1 Meeting #89, Hangzhou, P.R. China May 15-19, 2017, p. 1-8.
Fujitsu: "NR-PBCH design", 3GPP Draft; 1707253 NR-PBCH Design 3rd Generation Partnership Project (3GPP), Mobile Competence Centre; 650, Route Des Lucioles; F-06921 Sophia-Antipolis Cedex; France, vol. RAN WGI, No. Hangzhou, China; Apr. 15, 2017- Apr. 19, 2017, May 5, 2017 (May 5, 2017), XP051261275, Retrieved from the Internet: URL:http://www.3gpp.org/ftp/tsg_ran/WG1_RL1/TSGR1_89/Docs/.
ITL-"NR-PBUH design aspects", 3GPP Draft; R1-118328, 3rd Generation Partnership Project (3GPP), Mobile Competence Centre; 650, Route Des Lucioles; F-06921 Sophia-Antipolis Cedex; France, vol. RAN WGI, No. Hangzhou; May 15, 2017-May 19, 2017, May 14, 2017 (May 14, 2017), XP051273521, Retrieved from the Internet: URL:http://www.3gpp.org/ftp/Meetings_3GPP_SYNC/RAN1/Docs/.

* cited by examiner

METHOD AND APPARATUS FOR GENERATING AND USING REFERENCE SIGNAL FOR BROADCAST CHANNEL FOR RADIO SYSTEM

This application claims the priority and benefit of U.S. Provisional Patent 62/520,434, filed Jun. 15, 2017, entitled "METHOD AND APPARATUS FOR GENERATING AND USING REFERENCE SIGNAL PHYSICAL FOR BROADCAST CHANNEL FOR RADIO SYSTEM", and which is incorporated herein by reference in its entirety.

TECHNICAL FIELD

The technology relates to wireless communications, and particularly to methods and apparatus for generating and using a reference signal, and particularly a demodulation reference signal for a Physical Broadcast Channel (PBCH).

BACKGROUND

In wireless communication systems, a radio access network generally comprises one or more access nodes (such as a base station) which communicate on radio channels over a radio or air interface with plural wireless terminals. In some technologies such a wireless terminal is also called a User Equipment (UE). A group known as the 3rd Generation Partnership Project ("3GPP") has undertaken to define globally applicable technical specifications and technical reports for present and future generation wireless communication systems. The 3GPP Long Term Evolution ("LTE") and 3GPP LTE Advanced (LTE-A) are projects to improve an earlier Universal Mobile Telecommunications System ("UMTS") mobile phone or device standard in a manner to cope with future requirements.

Work has started in the International Telecommunications Union (ITU) and 3GPP to develop requirements and specifications for new radio (NR) 5G systems, e.g., fifth generation systems. Within the scope of 3GPP, a new study item (SID) "Study on New Radio Access Technology" has been approved. The timeline and the study situations of NR development are summarized in RP-161596, "Revision of SI: Study on New Radio Access Technology", 3GPP TSG RAN Meeting #73, New Orleans, Sep. 19-22, 2016. In order to fulfill 5G requirements, changes with regard to 4G LTE system have been proposed for study, such as higher frequency spectrum usage (e.g., 6 GHz, 40 GHz or up to 100 GHz), scalable numerology (e.g., different subcarrier spacing (SCS), 3.75 KHz, 7.5 KHz, 15 KHz (current LTE), 30 KHz . . . possibly 480 KHz), beam based initial access (one traditional cell may contain multiple beams due to the particular beamforming adopted).

Some legacy LTE systems may be treated as single beam systems. Moreover, in such LTE systems, hierarchical synchronization signals, i.e., primary synchronization sequences (PSS) and secondary synchronization sequences (SSS) provide coarse time/frequency synchronization, physical layer cell ID (PCI) identification, subframe timing identification, frame structure type (FDD or TDD) differentiation and cyclic prefix (CP) overhead identification. Further, a physical broadcast channel (PBCH) provides additional information, such as system frame number (SFN) and essential system information so that a wireless terminal (e.g., UE) can obtain information to access the network. An initial access procedure for such LTE system is illustrated in FIG. 1.

In LTE system, three PSS sequences provide identification of cell ID (0-2); and SSS sequences provide identification of cell ID group (0-167). Therefore, in all 168*3=504 PCI IDs are supported in the LTE system. In a RAN1 #87 meeting, it was pointed out that "Number of IDs provided by NR-PSS/SSS" should be studied. See, e.g., 3GPP RAN1 #87 Chairman's Notes. Further, in RAN1 #86 meeting, it was agreed that "Detection of NR cell and its ID. See, e.g., 3GPP RAN1 #86 Chairman's Notes.

It is anticipated that in the next generation new radio (NR) technology, a cell may correspond to one or multiple transmission and reception point (TRPs). This means multiple TRPs can share the same NR cell ID, or each transmission and reception point (TRP) may have its own identifier. Further, the transmission of one TRP can be in the form of single beam or multiple beams. Each of the beams may also possibly have its own identifier. FIG. 2 provides a simple example depiction of a relationship between cell, transmission and reception point (TRP), and beam.

It has been agreed in RAN1 #86bis meeting (See, e.g., 3GPP RAN1 #86bis Chairman's Notes) that:
 PSS, SSS and/or PBCH can be transmitted within a 'SS block'
  Multiplexing other signals are not precluded within a 'SS block'
 One or multiple 'SS block(s)' compose an 'SS burst'
 One or multiple 'SS burst(s)' compose a 'SS burst set'
  The Number of SS bursts within a SS burst set is finite.
 From RAN1 specification perspective, NR air interface defines at least one periodicity of SS burst set (Note: Interval of SS burst can be the same as interval of SS burst set in some cases, e.g., single beam operation)

FIG. 3 is an example NR SS block structure according to the RAN1 #86bis meeting. In FIG. 3, "synchronization signal bursts series" represents a "SS burst set". Additional detailed examples are illustrated in R1-1610522, "WF on the unified structure of DL sync signal", Intel Corporation, NTT DOCOMO, ZTE, ZTE Microelectronics, ETRI, InterDigital, Lisbon, Portugal, 10-14 Oct. 2016. According to R1-1611268, "Considerations on SS block design", ZTE, ZTE Microelectronics, Reno, USA, November 2016, 14-18, 2016, the structure of the SS block of FIG. 3 may be as shown in FIG. 4. FIG. 4 shows that a synchronization signal block may be structure as a time division multiplex synchronization signal block, or as a frequency division multiplex synchronization signal block, or as a hybrid. FIG. 4 further shows that a synchronization signal block may comprise, e.g., sync signals (such as primary synchronization signal (PSS) and a secondary synchronization signal (SSS)), and a physical broadcast channel (PBCH), or other non-sync/non-PBCH information (such as reference signals, for example).

According to 3GPP RAN1 #87 Chairman's Notes, it has been further agreed, see, e.g., 3GPP TSG RAN WG2 Meeting #98, Hangzhou, China, 15-19 May 2017, that:
 At least for multi-beams case, at least the time index of SS-block is indicated to the UE
 From the UE perspective, SS burst set transmission is periodic, and that at least for initial cell selection, the UE may assume a default periodicity of SS burst set transmission for a given carrier frequency As illustrated in FIG. 3, one or multiple SS block(s) compose an SS burst, and one or multiple SS burst(s) further compose an SS burst set where the number of SS bursts within a SS burst set is finite. A SS burst may be defined as (a set of) consecutive time and/or consecutive frequency resources, e.g., 14 consecutive OFDM symbols. If there is always one SS burst composing a SS burst set, then there is no need to refer to SS burst since the description of SS burst set suffices. In order to identify the SS block, and/or SS burst, and/or SS burst set, as well as identifying timing such as frame/slot/symbol timing, the index information is defined. As used herein, "index information for the synchronization signal block" and "index information" and "time index" are used interchangeably to refer to a mechanism for identifying or distinguishing a certain synchronization signal block, and may include the timing or resource grid-specifying information such as frame/slot/symbol timing.

The maximum integer number "L" of SS-blocks within a SS burst set may be specified. It is possible that, in different frequency bands, L may have respective different values, e.g., for frequency range up to 3 GHz, L could be 4; for frequency range from 3 GHz to 6 GHz, L could be 8; for frequency range from 6 GHz to 52.6 GHz, L could be 64. Therefore, in different frequency range, the required bit numbers to represent at least SS block index information within a SS burst set are 2, 3 and 6 respectively.

A wireless terminal should be able to perform beam/cell measurement and identification quickly and reliably with minimal need for measurement gaps. If there is considerable delay due to reading information, there might be impact on handover performance and UE power consumption. Beam/cell measurement typically involves measurement of a reference signal, of which there may be several types including reference signals which are carried in or formed by primary synchronization signals (PSS) or secondary synchronization signals (SSS) or channel state information (CSI) of a synchronization signal block. It is also likely that, at least in the New Radio 5GPP systems, the Physical Broadcast Channel (PBCH) may also have its own reference signal.

What is needed, therefore, and examples object of the technology disclosed herein, are methods, apparatus, and techniques for permitting a wireless terminal to quickly and reliably obtain information and, where necessary, measure and/or otherwise use reference signals, particularly in a New Radio system which employs synchronization signal blocks.

SUMMARY

In some of its example aspects the technology disclosed herein overcomes inefficiencies in telecommunications operations by, e.g., providing a particular technique for generating a reference signal for a Physical Broadcast Channel (PBCH), and generating/using the reference signal for a Physical Broadcast Channel (PBCH) for multiple purposes, e.g., at least one purpose beyond demodulation of the Physical Broadcast Channel (PBCH)

In one of its example aspects the technology disclosed herein concerns a user equipment. The user equipment comprises a receiver circuitry and processor circuitry. In an example embodiment and mode, the receiver circuitry is configured for receiving a synchronization signal block and a demodulation reference signal for a Physical Broadcast Channel (PBCH) over a radio interface. The processor circuitry is configured to determine a parameter of the radio access network from the demodulation reference signal. In another of its example aspects the technology disclosed herein concerns a method of operating such a wireless terminal.

In another of its example aspects the technology disclosed herein concerns an access node of a radio access network. The access node comprises transmitter circuitry and processor circuitry. In an example embodiment and mode the processor circuitry is configured to generate a synchronization signal block comprising a Physical Broadcast Channel (PBCH) and a demodulation reference signal for the Physical Broadcast Channel (PBCH) from which demodulation reference signal a parameter of the radio access network can be determined. The transmitter circuitry is configured to transmit the synchronization signal block and the demodulation reference signal over a radio interface. In another of its example aspects the technology disclosed herein concerns a method of operating such an access node.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

DETAILED DESCRIPTION

Figure 1:
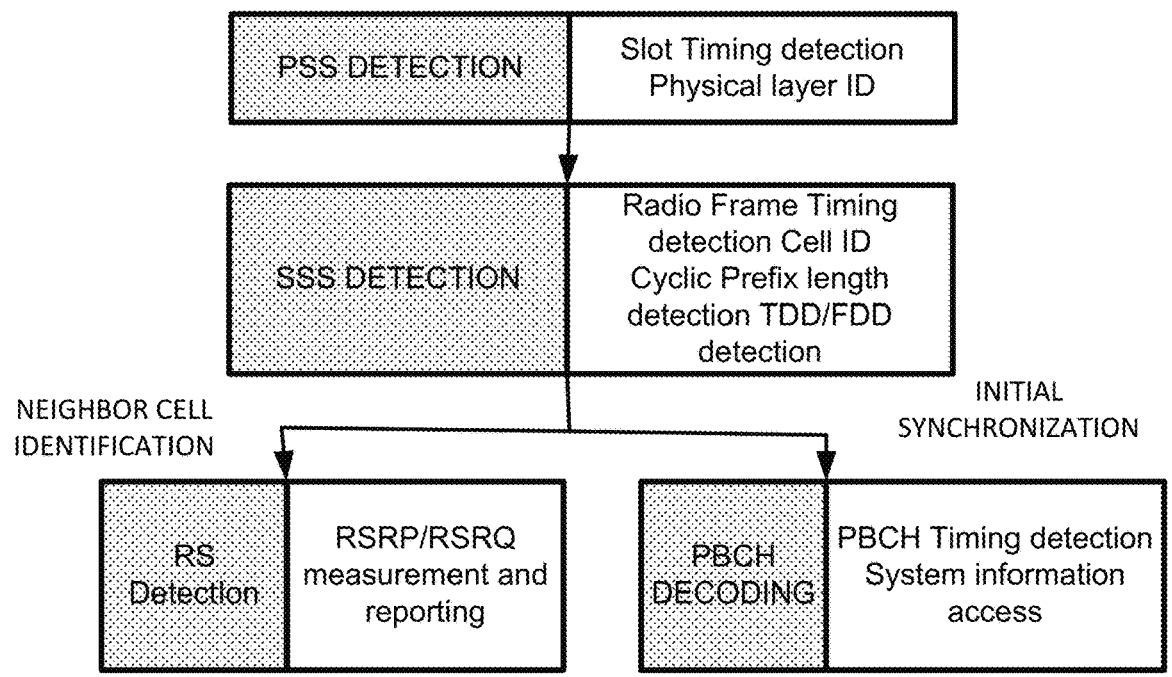
FIG. 1 is a diagrammatic view showing information utilized in an LTE initial access procedure.
Figure 2:
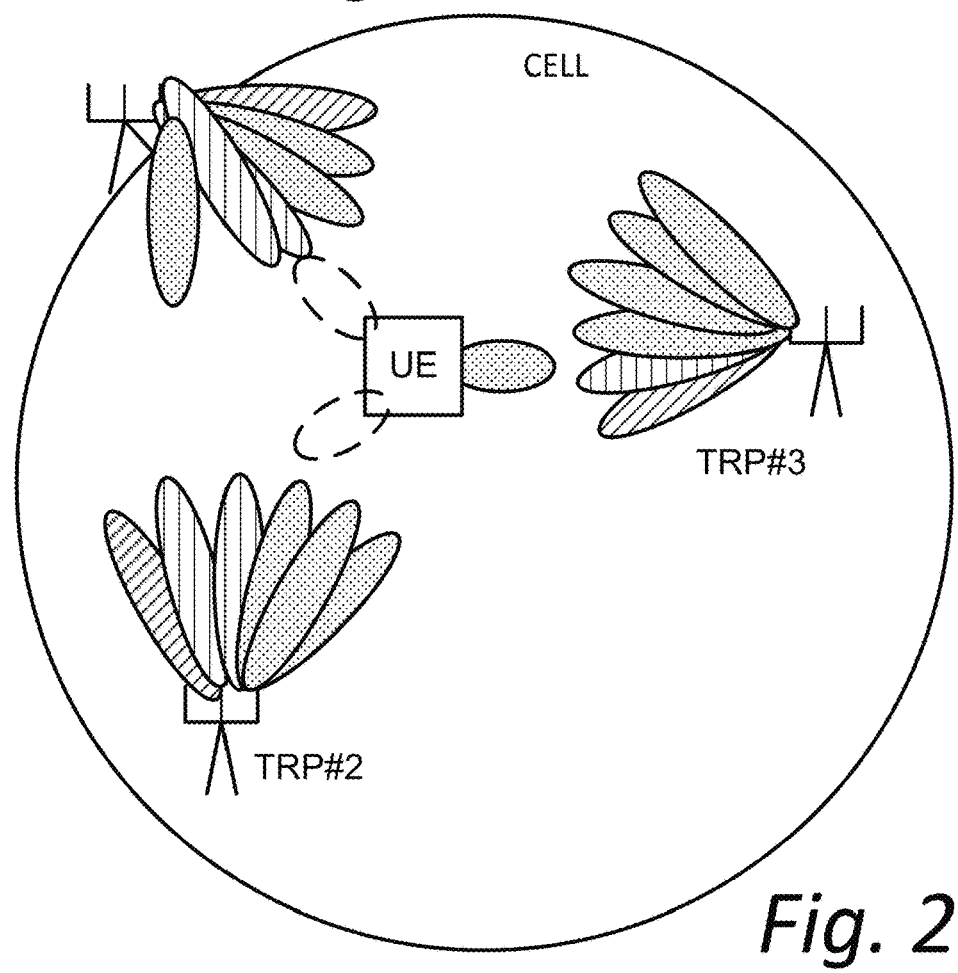
FIG. 2 is a diagrammatic view showing an example relationship between cell, transmission and reception point (TRP), and beam

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, tablets, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of an access node may include, in the 3GPP specification, a Node B ("NB"), an enhanced Node B ("eNB"), a home eNB ("HeNB"), or in the 5G terminology, a gNB or even a transmission and reception point (TRP), or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, . . . ), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B or gNB, and a UE terminal. A cellular network using licensed frequency bands can include configured cells. Configured cells can include cells of which a UE terminal is aware and in which it is allowed by a base station to transmit or receive information.

FIG. 5A-FIG. 5D each shows an example communications systems 20A-20D wherein radio access network nodes 22A-22D (collectively referred to as radio access node 22) communicate over air or radio interface 24 (e.g., Uu interface) with wireless terminals 26A-26D (collectively referred to as wireless terminal 26). As mentioned above, the radio access node 22 may be any suitable node for communicating with the wireless terminal 26, such as a base station node, or eNodeB ("eNB") or gNodeB or gNB, for example. As used herein, an "access node" or "node" should be understood to encompass all concepts relating to a node, such as (for example) to a cell served by the node. Constituent elements and functionalities of the example communications systems 20A-22D which are similar in the various example embodiment and modes are designated by same reference numerals.

The node 22 comprises node processor circuitry ("node processor 30") and node transceiver circuitry 32. The node transceiver circuitry 32 typically comprises node transmitter circuitry 34 and node receiver circuitry 36, which are also called node transmitter and node receiver, respectively.

The wireless terminal 26 comprises terminal processor 40 and terminal transceiver circuitry 42. The terminal transceiver circuitry 42 typically comprises terminal transmitter circuitry 44 and terminal receiver circuitry 46, which are also called terminal transmitter 44 and terminal receiver 46, respectively. The wireless terminal 26 also typically comprises user interface 48. The terminal user interface 48 may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

For both the radio access node 22 and wireless terminal 26, the respective transceiver circuitries 22 include antenna (s). The respective receiver circuits 36 and 46 may comprise, e.g., amplifier(s), modulation circuitry and other conventional transmission equipment. The transmitter circuitry 34 may comprise transmitters for plural beams, e.g., transmitter 34-1 for beam 0 though and including transmitter 34-(M−1) for beam M−1 (there being a total number of integer M potential beam transmitters in this particular non-limiting example). The respective receiver circuits 36 and 46 may comprise, e.g., amplifiers, demodulation circuitry, and other conventional receiver equipment.

In general operation node, access node 22 and wireless terminal 26 communicate with each other across radio interface 24 using predefined configurations of information.

By way of non-limiting example, the radio access node 22 and wireless terminal 26 may communicate over radio interface 24 using "frames" of information that may be configured to include various channels. In technologies such as but not limited to Long Term Evolution (LTE) and the fifth generation (5G) New Radio (NR), for example, a frame, which may have both downlink portion(s) and uplink portion(s), may comprise plural subframes, with each LTE subframe in turn being divided into two slots. The frame may be conceptualized as a resource grid (a two dimensional grid) comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. The frame and subframe structure serves only as an example of a technique of formatting of information that is to be transmitted over a radio or air interface. It should be understood that "frame" and "subframe" may be utilized interchangeably or may include or be realized by other units of information formatting, and as such may bear other terminology (such as blocks, or symbol, slot, mini-slot in 5G for example).

To cater to the transmission of information between radio access node 22 and wireless terminal 26 over radio interface 24, the node processor 30 and terminal processor 40 of FIG. 5A-FIG. 5D are shown as comprising respective information handlers. For an example implementation in which the information is communicated via frames, the information handler for radio access node 22 is shown as node frame/signal scheduler/handler 50, while the information handler for wireless terminal 26 is shown as terminal frame/signal handler 52.

Figure 3:
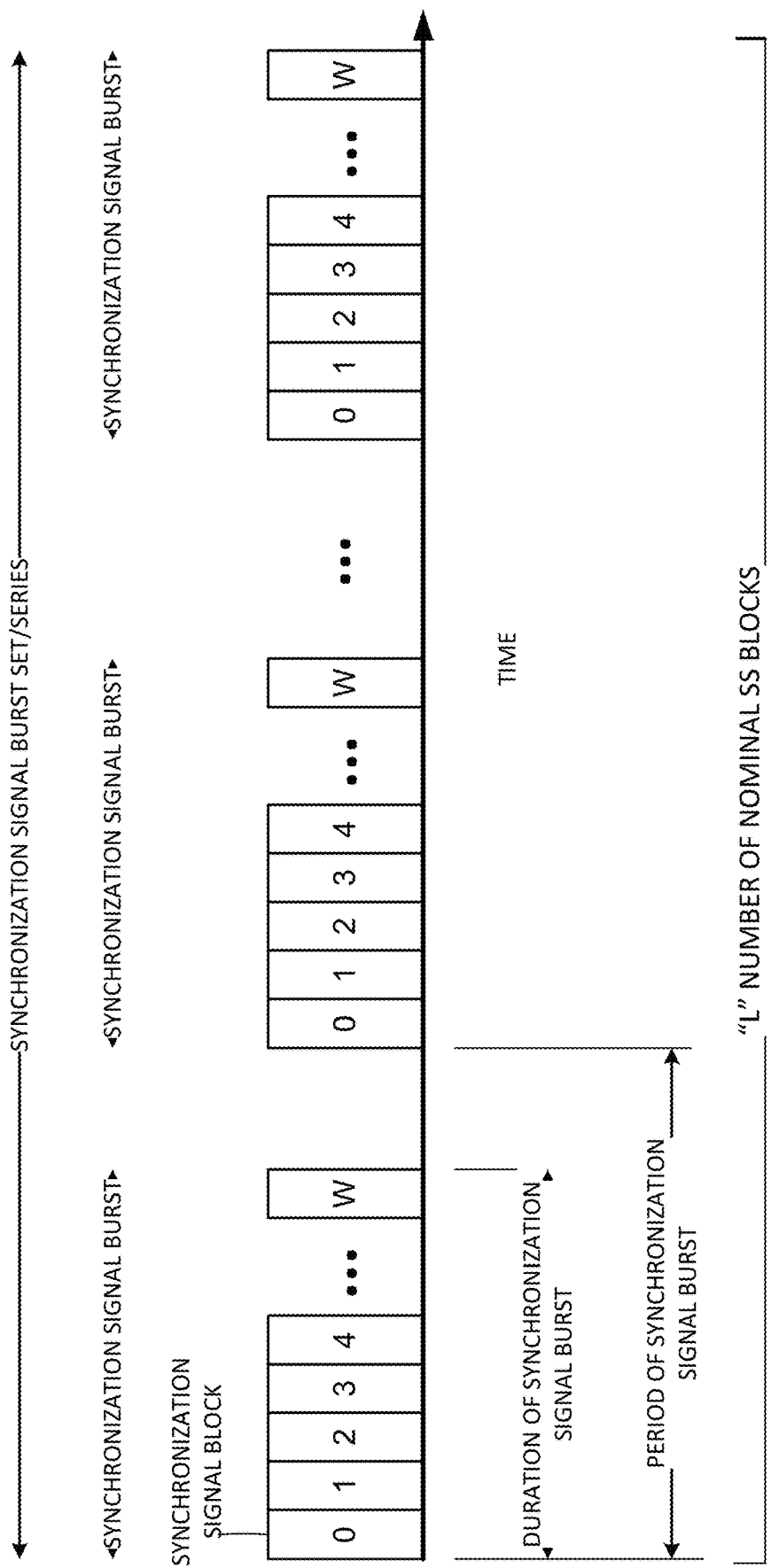
FIG. 3 is a diagrammatic view showing example NR SS block structure according to the RAN1 #86bis meeting.
Figure 4:
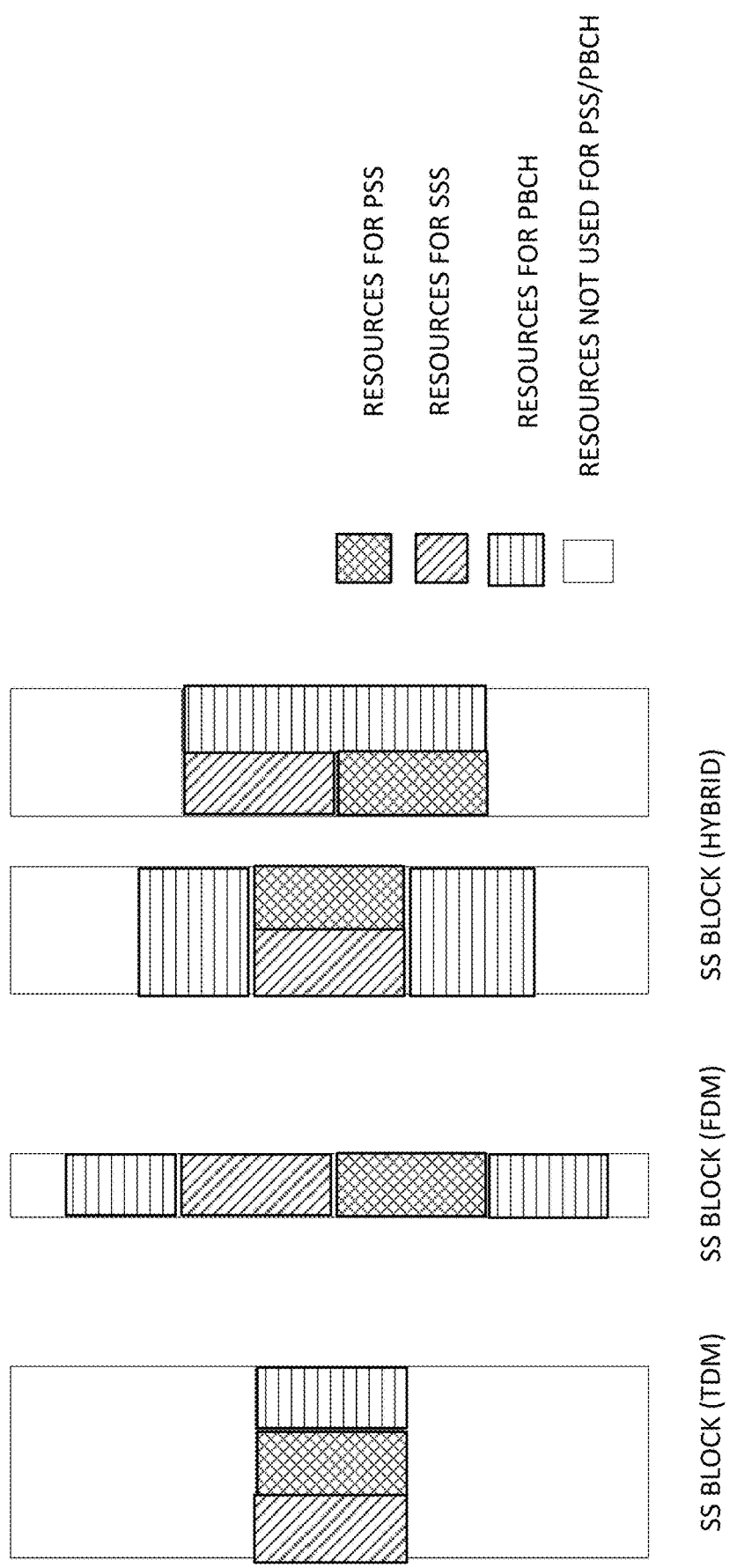
FIG. 4 is a diagrammatic view showing example structure of the SS block of FIG. 3.
Figure 5A:
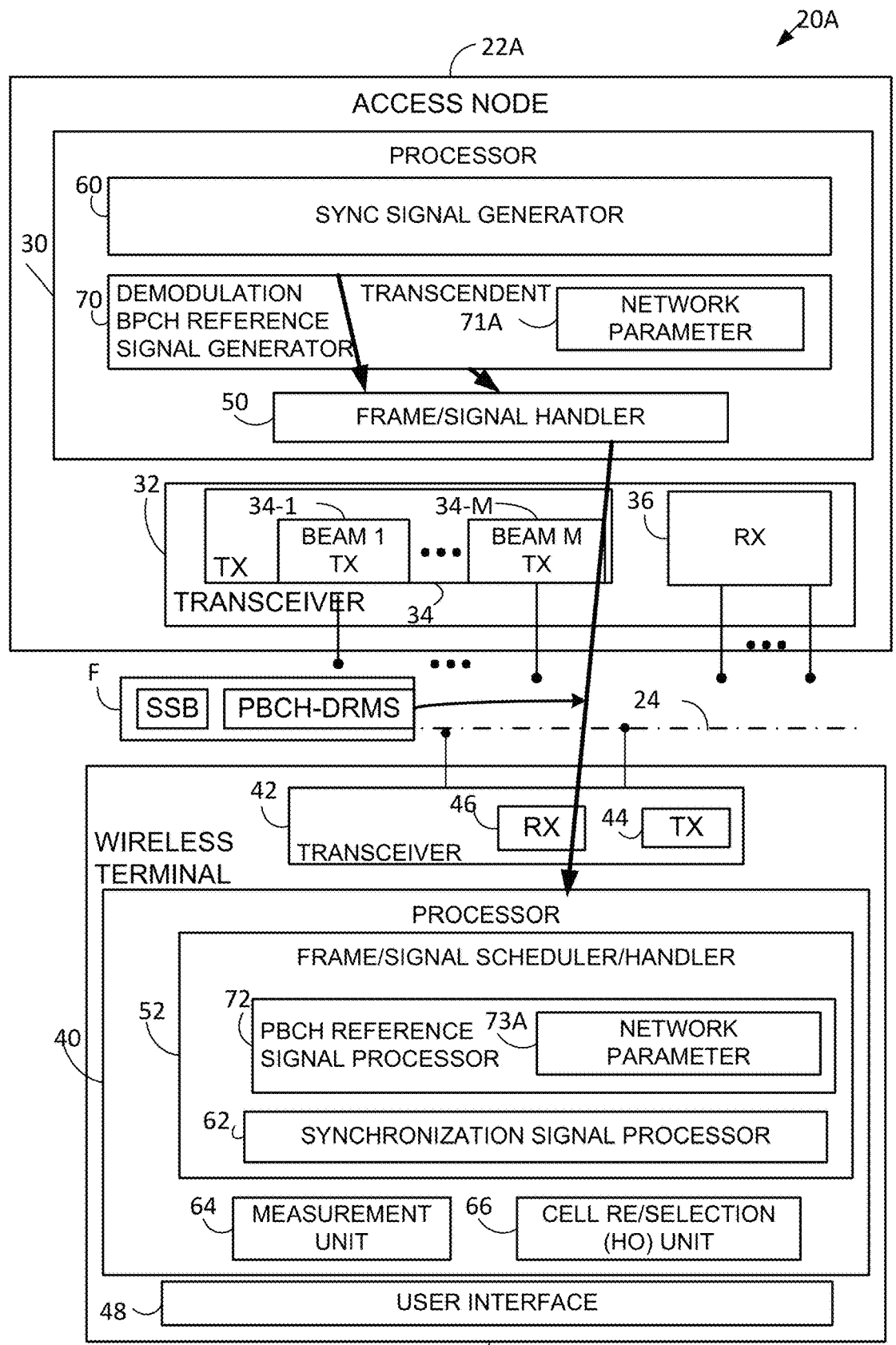
FIG. 5A-FIG. 5D are schematic views showing an example communications systems comprising differing configurations of radio access nodes and a wireless terminal, and wherein the radio access nodes provide beam utilization information.

The node processor 30 of radio access node 22 comprises synchronization signal generator 60. The synchronization signal generator 60 generates a synchronization signaling (SS) block for radio access node 22, such as the synchronization signaling (SS) blocks shown in the synchronization signal block burst set of FIG. 3. Node transmitter circuitry 34 of radio access node 22 may comprise plural beam transmitters, such as an integer number L of beam transmitters 34-1 through 34-M for transmitting as many as M beams (beams 0-(M−1)) as shown in FIG. 5A.

The wireless terminal 26A comprises synchronization signal processor 62 which handles the synchronization signaling (SS) block after the synchronization signal block is received by terminal receiver circuitry 46. The synchronization signal processor 62 may comprise terminal frame/signal scheduler/handler terminal frame/signal handler 52, which in turn may comprise terminal processor 40. The synchronization signal processor 62 decodes the synchronization signaling (SS) blocks, and attempts to obtain, for each synchronization signal block, the index information for the synchronization signal block. As stated above, the index information for the synchronization signal block may also be referred to as the "index information" or "time index", all of which may be used interchangeably to refer to a mechanism for identifying or distinguishing a certain synchronization signal block. As such the index information for the synchronization signal block may comprise the timing information or resource grid-specifying information such as frame/slot/symbol timing for the particular synchronization signal block so identified. In some example embodiment and modes the synchronization signal processor 62 attempts to obtain from each synchronization signal block an indication of the identity of the particular beam by which the synchronization signaling (SS) block was broadcast. It should be kept in mind that the synchronization signal blocks may not be received in the exact order shown, so that it is preferable when possible to receive some signature or other identification for the beam that carried each received synchronization signal block.

The wireless terminal 26A needs to know an identification of each beam associated with each synchronization signal block in the synchronization signaling (SS) block burst set for reference signal measurement purposes, and ultimately for possible cell selection, cell re-selection, and/or handover based on such measurements. FIG. 5A shows that wireless terminal 26A comprises reference signal measurement unit 64 ("measurement unit 64"), which detects the energy received in the reference signals which, in some example implementations, may either themselves or equivalents thereof, be included in the synchronization signal blocks, as explained below. The measurements of reference signals are performed with respect to each beam, for which reason it is important that the synchronization signal blocks received in a synchronization signaling (SS) block burst set be distinguishable on a beam basis. The measurement unit 64 takes measurements for each beam over a measurement time window, and averages or otherwise quantifies such measurements for each beam over the measurement time window. The measurement unit 64 may, in a "filtering" operation, further quantify, score, or rate the transmission strength or quality of a certain node based on measurements taken from one or more beams of the node. For example, the measurement unit 64 may average results from plural beams of the node (e.g., all beams of the node, a predetermined number of beams of the node, a certain number of best beams of the node, etc.). The measurement unit 64 is typically performing beam measurements with respect to several cells/nodes. Typically the wireless terminal 26A has been directed to monitor or measure not only the strength of a serving node through which the wireless terminal 26A primarily communicates with the radio access network, but also with several other "neighboring" nodes that may be of interest for possible handover should the strength of the serving node sufficient decline.

In at least some implementations reference signals may be included in the synchronization signal blocks. For example, in addition to its synchronization function, the secondary synchronization signal (SSS) may serve as a reference signal for measurements for an idle mode wireless terminal. The SSS may serve, at least to some degree, as a reference signal, and being in the synchronization signal block means that such synchronization signal block includes a reference signal. It is also possible that a channel state information-reference signal (CSI-RI) may be included in the synchronization signal block and, if included, may serve as either alternative or additional reference signal symbols for measurement. Alternatively, the CSI-RI may be (1) included in the concept of a SS burst (an SS burst may be formed by an SS block with some additional signal and/or data and/or signaling, such as CSI-RS, PDSCH, PDCCH), or (2) included somewhere with some pre-defined relative positions from SS block, but not counted as neither part of an SS block, nor part of an SS burst, nor part of an SS burst set.

Figure 6A:
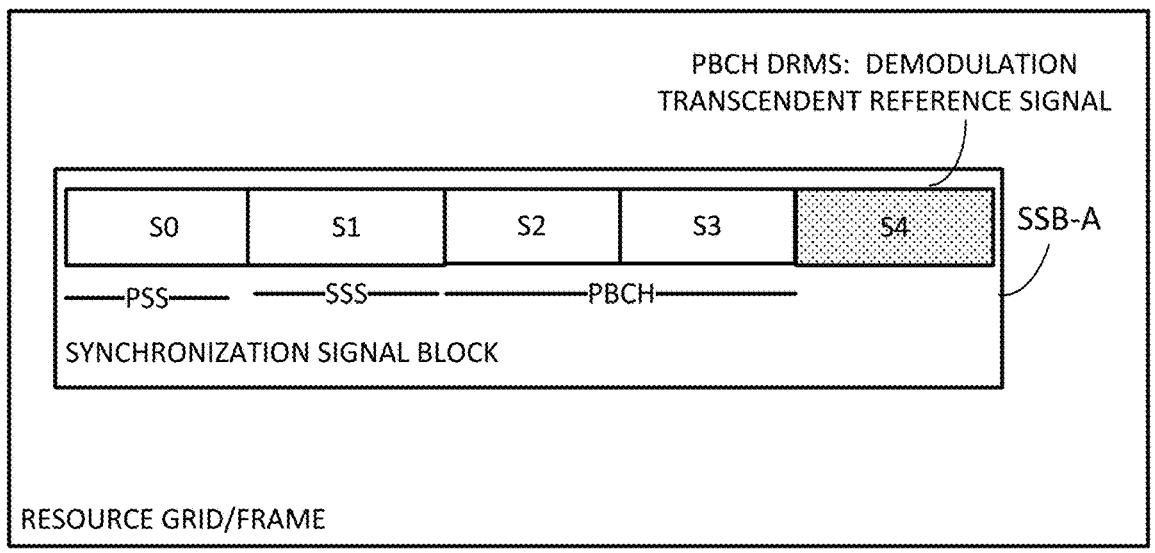
FIG. 6A is a diagrammatic views depicting a PBCH demodulation reference signal as comprising a synchronization signal block.
Figure 6B:
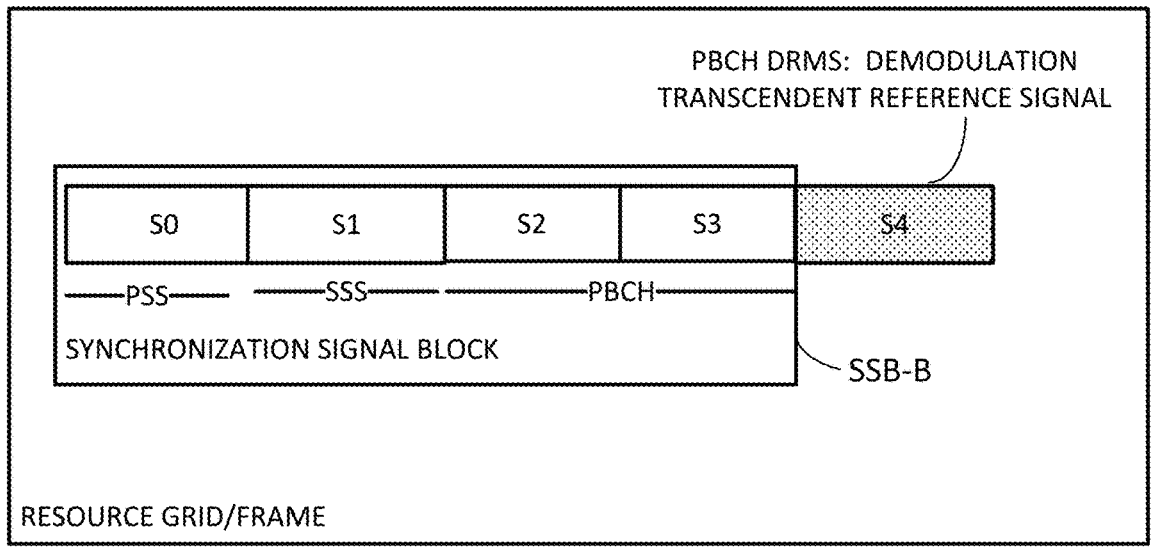
FIG. 6B is a diagrammatic view depicting a PBCH demodulation reference signal residing in resource grid outside of the Physical Broadcast Channel (PBCH) for which it serves as a reference signal.

It is anticipated that a further type of reference signal may be provided for the 5G New Radio technology. In particular, in 5G the Physical Broadcast Channel (PBCH) may have its own demodulation reference signal, herein also known as PBCH DMRS or (emphasizing the use in New Radio) as NR-PBCH DMRS. Whereas in LTE other channels such PDSCH had their own reference signal, prior to 5G the PBCH had no separate reference signal. In simplistic depiction FIG. 6A and FIG. 6B show basic example alternative ways of providing a PBCH demodulation reference signal. FIG. 6A illustrates an example synchronization signal block SSB-A which (for sake of example) comprises five symbols. A synchronization signal block is a logical block, and not a physical block, and may form a part of an overall resource grid. In the synchronization signal block SSB-A of FIG. 6A the first symbol (symbol S0) is the primary synchronization signal (PSS) symbol, the second symbol (symbol S1) is the secondary synchronization signal, and the next two symbols (symbols S2 and S3) are PBCH symbols. Symbol S4 in block SSB-A of the particular example of FIG. 6A is or includes the PBCH demodulation reference signal (PBCH DRMS). Symbol S4 is considered as part of the synchronization signal block. In FIG. 6B, on the other hand, the PBCH demodulation reference signal is shown as symbol S4 which is "outside" or "external" to the synchronization signal block, e.g., carried in a symbol that does not form the logical synchronization signal block. Thus, it should be understood that the demodulation reference signal may be logically grouped with a synchronization signal block in the case of FIG. 6A, or exist separately from the logical synchronization signal block in the manner of FIG. 6B For layer 3 (L3) mobility, the reference signal received power (RSRP)/reference signal received quality (RSRQ) definitions for downlink radio resource management (RRM) measurement are:

SS block RSRP/RSRQ: measured RSRP/RSRQ either from NR-SSS only, or from NR-PBCH DMRS only; or from both NR-SSS and NR-PBCH.

CSI-RS RSRP/RSRQ: measured RSRP/RSRQ from CSI-RS in connected mode where:

SS block RSRP/RSRQ is at least for idle/inactive Mode L3 mobility either CSI-RS RSRP/RSRQ alone or the combination of SS block RSRP/RSRQ and CSI-RS RSRP/RSRQ is used for connected mode L3 mobility.

When the wireless terminal is in idle/inactive mode, the RRM measurement is for potential cell selection/reselection, which is based on cell level measurement. Since in the in idle/inactive mode the SS block RSRP/RSRQ is obtained through measuring cell level NR-PSS/SSS and/or cell level PBCH DMRS, after one shot of measurement of one SS block RSRP/RSRQ, or after one shot of measurement of multiple SS block RSRP/RSRQ within one SS burst set, the wireless terminal knows the quality of neighboring cell with corresponding cell ID from PSS and SSS in the SS block. As such when in the idle/inactive mode it is not necessary for the wireless terminal to acquire the time index indication to know each beam's quality. Nevertheless, in contrast to the idle/inactive mode, in the connected mode the wireless terminal still does need to know the time index indication for measurement purpose.

Whatever type(s) of reference signal may be available, such reference signal(s) are measured by measurement unit 64. The measurements collected by measurement unit 64 are transmitted or reported to a cell selection/re-selection/handover functionality. Such functionality may either be at the wireless terminal itself as in the case shown in FIG. 5A, or at the radio access node 22A. Thus FIG. 5A further shows terminal processor 40 of wireless terminal 26A as comprising cell selection/re-selection/handover (HO) unit 66. The cell selection/re-selection/handover unit 66 serves to compare the filtered measurements of plural cells, and to generate a communication or request to the radio access network in the event that the cell selection/re-selection/ handover unit 66 believes that a change in relative signal strength of competing nodes justifies a transfer or handover to a neighboring node.

In view of the foregoing, it should be appreciated that a wireless terminal should be able to perform beam/cell measurement and identification quickly and reliably with minimal need for measurement gaps. If there is considerable delay due to reading information, there might be impact on handover performance and UE power consumption. See, e.g., R2-1706160, "Response LS on reading time index indication for RRM measurements".

As one of its various aspects, described below, the technology disclosed herein concerns use of a PBCH DMRS to express or convey other information, e.g., information other than measurable reference information, from a radio access node 22 to a wireless terminal 26. In other words, in various aspects of the technology disclosed herein the PBCH demodulation reference signal serves a purpose beyond facilitating demodulation and/or use of the Physical Broadcast Channel (PBCH) itself. The PBCH demodulation reference signal according to these aspects of the technology disclosed herein is thus also sometime herein described as a "demodulation transcendent" reference signal. As such the node processor 30 of radio access node 22A generates a demodulation reference signal for the Physical Broadcast Channel (PBCH) from which a parameter of the radio access network can be determined. For example, the node processor 30 may comprise PBCH reference signal generator 70 that generates the demodulation transcendent PBCH demodulation reference signal, with such demodulation transcendent PBCH demodulation reference signal being dependent on, or related to, a parameter of the radio access network. That the PBCH reference signal generator 70 of FIG. 5A has available thereto and generically uses a parameter of the radio access network to configure the PBCH demodulation reference signal is reflected by network parameter memory 71A. Examples of the radio access network parameter which can be expressed by and determined from the demodulation transcendent PBCH demodulation reference signal include but are not limited to any one or combination of the following:

[1] $N_{ID}^{cell}$: physical layer cell identity;
[2] l: the OFDM symbol number within the slot;
[3] $n_s$: the slot number within a radio frame;
[4] $n_{b1}$: the SS block index, either within a SS burst, or within a SS block burst set;
[5] $n_{b2}$: the SS burst index within a SS burst set;
[6] v: starting symbol number within 5 ms SS block transmission time window from a SS burst set.

Regarding item [6] above, in each SS burst set, e.g., 28 symbols in time domain, all SS block transmissions are confined in a 5 ms window. Five (5) ms in time domain might consist of several symbols, e.g., 7 symbols. If an SS block occupies 4 symbols, then whether the SS blocks starts to be transmitted in the first symbol, or second symbol, or third symbol, or fourth symbol, may affect the initialization and thus the generation of PBCH DMRS sequence. For such reason the starting symbol number within the 5 ms SS block transmission time window from a SS burst set may be a beneficial network parameter.

Thus in FIG. 5A the radio access node 22A comprises node processor 30 which is configured to generate (1) a synchronization signal block comprising a Physical Broadcast Channel (PBCH) and (2) a demodulation transcendent PBCH demodulation reference signal for the Physical Broadcast Channel (PBCH) from which demodulation reference signal a parameter of the radio access network can be determined. Although the terminology "demodulated transcendent" reference signal m or may not be used at certain times herein, any demodulation reference signal which also indicates or from which a parameter of the radio access network can be determined should be understood to be "transcendent" in view of the additional information carried thereby, whether or not such term is explicitly used. The node transmitter circuitry 34 is configured to transmit the synchronization signal block and the demodulation reference signal over the radio interface 24. FIG. 5A shows, by way of example, both the synchronization signal block and the demodulation transcendent PBCH demodulation reference signal (PBCH DMRS) being transmitted over radio interface 24 in a frame F. It should be understood that transmission in a single frame F is just one possible way of transmission, and that other units or other expressions of information grouping other than frame may be utilized.

Figure 7A:
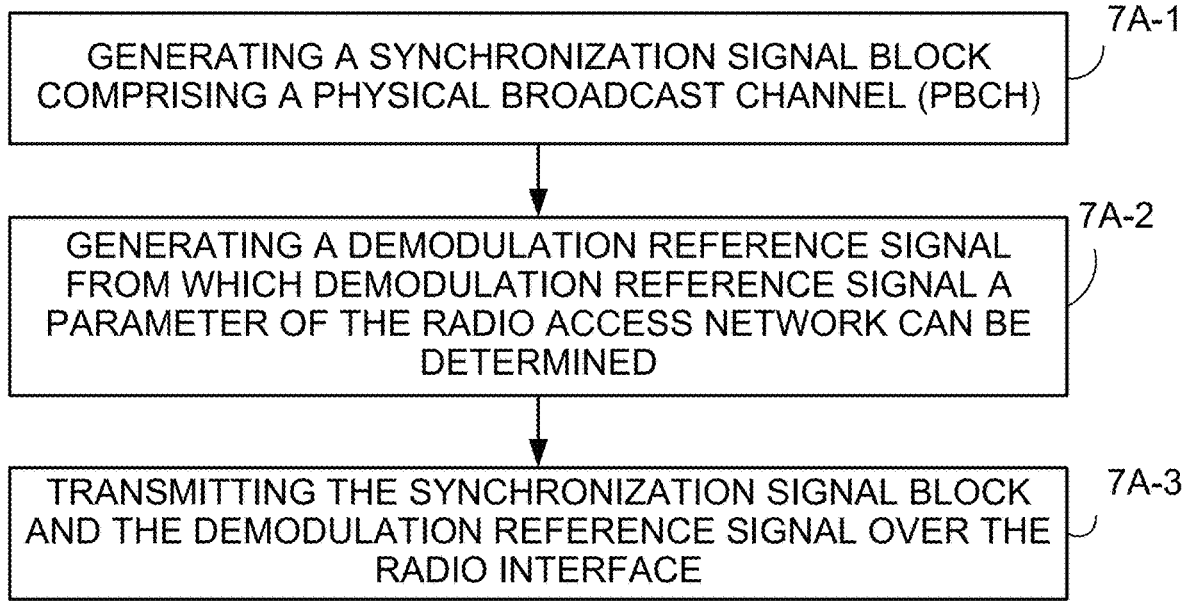
FIG. 7A-FIG. 7D are flowcharts showing example, non-limiting, representative acts or steps performed by the radio access node of the example embodiment and mode of FIG. 5A.

Basic, representative acts or steps performed by the radio access node 22A of FIG. 5A are shown in FIG. 7A. Act 7A-1 comprises the node processor 30 generating a synchronization signal block comprising a Physical Broadcast Channel (PBCH). Act 7A-2 comprises the node processor 30 generating a demodulation reference signal for the Physical Broadcast Channel (PBCH) (e.g., PBCH DRMS) from which demodulation reference signal a parameter of the radio access network can be determined. Act 7A-3 comprises the node transmitter circuitry 34 transmitting the synchronization signal block and the demodulation reference signal (e.g., PBCH DRMS) over the radio interface 24, e.g., for example in frame F as shown in FIG. 5A.

The terminal processor 40 of wireless terminal 26A of FIG. 5A, and particularly terminal frame/signal scheduler/handler 52, comprises synchronization signal processor 62 and PBCH reference signal processor 72. The PBCH reference signal processor 72 serves to determine a network parameter from the PBCH demodulation reference signal which is included in a frame of information transmitted from the radio access node 22A. The network parameter so obtained may be stored in network parameter memory 73A for further use.

Figure 8A:
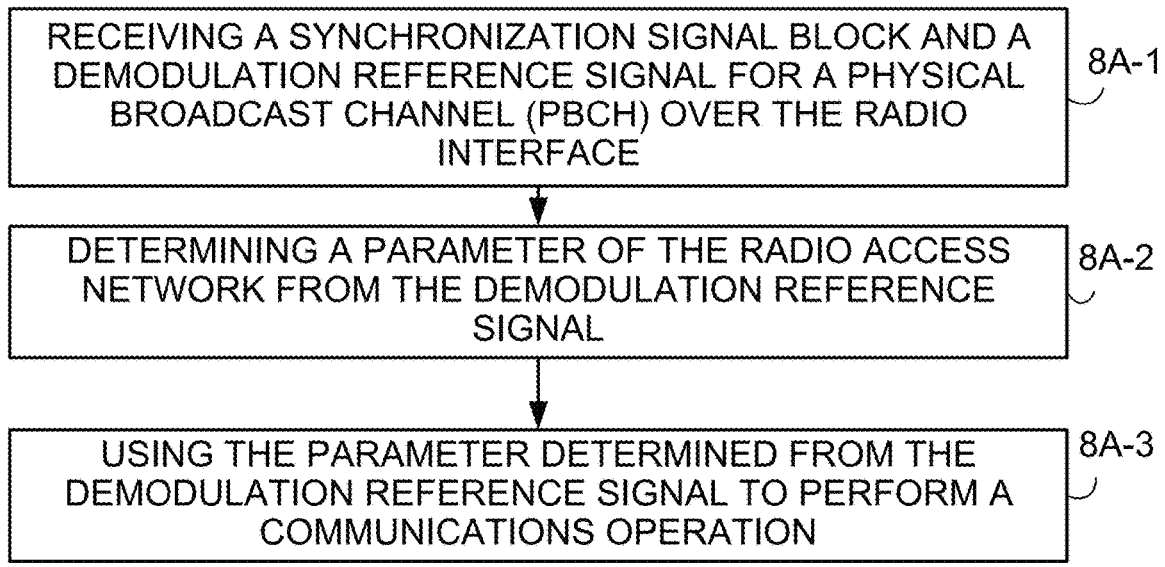
FIG. 8A-FIG. 8D are flowcharts showing example, non-limiting, representative acts or steps performed by the wireless terminal of the example embodiment and mode of FIG. 5A.

Basic, representative acts or steps performed by the wireless terminal 26A of FIG. 5A are shown in FIG. 8A. Act 8A-1 comprises receiver circuitry 46 receiving a synchronization signal block and a demodulation reference signal for a Physical Broadcast Channel (PBCH) (e.g., PBCH DRMS) over the radio interface 24. Act 8A-2 comprises the terminal processor 40, and particularly the PBCH reference signal processor 72, determining a parameter of the radio access network from the demodulation reference signal. An optional further act or step, act 8A-3, comprises the wireless terminal 26A using the parameter determined from the demodulation reference signal to perform a communications operation, such as a signal measurement and possibly even a cell selection/re-selection operation, for example.

Examples of how the PBCH reference signal generator 70 generates the PBCH demodulation reference signal so that the network parameter can be determined therefrom are described below. In an example embodiment and mode, the PBCH reference signal generator 70 generates the demodulation reference signal to comprise at least one sequence which is initialized with an initialization value that facilitates derivation or determination of the parameter of the radio access network by a wireless terminal such as wireless terminal 26A. As explained below, preferably the sequence which comprises the demodulation transcendent PBCH demodulation reference signal itself comprises plural m-sequences, and at least one of the plural m-sequences is initialized with the initialization value that facilitates the network parameter being determined from the demodulation reference signal.

The demodulation reference signal (DMRS) for PBCH serves a primary function of being the reference signal to help demodulate PBCH channel. Since the PBCH channel is a broadcast channel to the whole cell, instead of dedicated channel to particular UEs, the PBCH DMRS is also a cell level reference signal. The PBCH occupies 288 subcarriers and its associated DMRS does not occupy larger bandwidth.

The PBCH DMRS should be mapped to a specific antenna port, e.g., antenna port 0, 1, 2, 3, similar as a LTE cell specific reference signal; or to antenna port 5, 7, 8, 9, 10, similar as LTE PDSCH DMRS; or some other particularly predefined antenna port group.

The PBCH DMRS may be a type of psuedo random sequence, which could be an M-sequence, a Zadoff Chu sequence, a Gold sequence, or any other similar psuedo random sequence. In an example embodiment and mode described herein for sake of general illustration, use of a Gold sequence is described as an example to explain generation of the PBCH DRMS for various aspects of the technology disclosed herein.

A Gold sequence is generally constructed by modulo-2 addition of m-sequences. Accordingly, pseudo-random sequences are defined by a length-X Gold sequence, where, $X=2^x-1$, and x is an positive integer, e.g., x=5 and X=31, or x=6 and X=63, or x=7 and X=127, or x=8 and X=255. Considering PBCH occupies 288 subcarriers, x<9. An output sequence c(n) of length $M_{PN}$, where n=0, 1, . . . , $M_{PN}-1$, is defined by $c(n)=(x_1(n+N_{C1})+x_2(n+N_{c2}))\mod 2$ $x_1(n+X)=(x_1(n+N)+x_1(n))\mod 2$ $x_2(n+X)=(x_2(n+N)+ \ldots +x_2(n+1)+x_2(n))\mod 2$ where:
N is a positive integer; e.g., when N=3, $x_1(n+X)=(x_1(n+3)+x_1(n))\mod 2;$ $x_2(n+X)=(x_2(n+3)+x_2(n+2)+x_2(n+1)+x_2(n))\mod 2$ Also, $N_{C1}=y_1$, $N_{C2}=y_2$, (e.g., $y_1=y_2=1600$) and the first m-sequence shall be initialized with $x_1(0)=1$, $x_1(n)=0$, n=1, 2, . . . , X−1. Thus, in this particular example, the initialization value for the first m-sequence is always the same and thus does not necessarily determine the distinctiveness of the resultant PBCH DRMS formed using the first m-sequence and the second m-sequence. The initialization of the second m-sequence is denoted by $c_{init}=\Sigma_{i=0}^{X-1} x_2(i) \cdot 2^i$, with the value depending on the application of the sequence. In other words, the choice of the initialization value $c_{init}$ for the second m-sequence is at least partially determinative of the distinctiveness of the resultant PBCH DRMS formed using the first m-sequence and the second m-sequence.

The resultant PBCH demodulation reference-signal sequence r(m), (also known as PBCH DRMS), formed by the modulo operation of the first m-sequence and the second m-sequence, is thus defined by EXPRESSION 1:

$$r(m) = \frac{1}{\sqrt{2}}(1 - 2 \cdot c(2m)) + j\frac{1}{\sqrt{2}}(1 - 2 \cdot c(2m + 1)), \quad \text{EXPRESSION 1}$$

$$m = 0, 1, \ldots , N_{RE}^{PBCH\_DMRS} - 1$$

where $N_{RE}^{PBCH\_DMRS}$ denotes the assigned subcarrier number (or resource element number) per symbol in frequency domain for the corresponding PBCH DMRS transmission. This parameter is predefined so as to be known to the wireless terminal; in addition, it could be agnostic to carrier frequency, or predefined per carrier frequency band.

Considering that the PBCH occupies a 288 subcarrier bandwidth, the $N_{RE}^{PBCH\_DMRS}$ is also decided by whether NR-SSS is also used for PBCH demodulation. As one simple example, assuming that the PBCH DMRS has a one-to-one association with PBCH resource elements (Res) in frequency domain. If NR-SSS is not defined to participate in PBCH demodulation, then $N_{RE}^{PBCH\_DMRS}$=288. But if NR-SSS is defined to participate in PBCH demodulation and there is no overlapping between subcarriers carrying PBCH DMRS and NR-SSS is allowed, then $N_{RE}^{PBCH\_DMRS}$=288−127=161. If NR-SSS does not participate in PBCH demodulation, PBCH DMRS REs can have even distribution in frequency domain, and as such $N_{RE}^{PBCH\_DMRS}$ can have another format of interpretation as shown in EXPRESSION 2:

$$N_{RE}^{PBCH\_DMRS} = \alpha N_{RB}^{PBCH} \quad \text{EXPRESSION 2}$$

where $N_{RB}^{PBCH}$ is the assigned bandwidth in resource blocks of the corresponding PBCH transmission, and α denotes the number of DMRS REs corresponding to each resource block allocated for PBCH transmission. For example, if in the numerology of 12 subcarrier per resource block, the density of PBCH DMRS RE is defined to be one-to-one association between PBCH RE transmission and DMRS RE transmission, then α=12; if the density of PBCH DMRS is defined to be sparser, then α<12; α is predefined so as to be known to the UE; in addition, it could be agnostic to carrier frequency, or predefined per carrier frequency band.

If NR-SSS participates in PBCH demodulation, and NR-SSS occupies consecutive 127 subcarriers, then there are two alternative designs:

Alternative A.a>PBCH DMRS is mapped to subcarriers without NR-SSS occupation. In this situation, PBCH DMRS REs can still have even distribution in the frequency domain;

Alternative A.b>PBCH DMRS is mapped to subcarriers overlapped with NR-SSS subcarriers. In this situation, PBCH DMRS REs have uneven distribution: in the overlapped subcarriers, PBCH DMRS can have sparser distribution than in the non-overlapped subcarriers.

The pseudo-random sequence generator that comprises BPCH reference signal generator 70 shall be initialized with $c_{init}$ at the start of each OFDM symbol, which has the general form $$c_{init} = \sum_{i=0}^{X-1} x_2(i) \cdot 2^i,$$

as mentioned above. In this PBCH DMRS application case, it is similar as for LTE CRS, $c_{init}=2^{10} \cdot (7 \cdot (n_s'+1)+l+1) \cdot (2 \cdot N_{ID}^{cell}+1)+2 \cdot N_{ID}^{cell}+N_{CP}$, or similar as PDSCH DMRS, $c_{init}=(\lfloor n_s/2 \rfloor+1) \cdot (2N_{ID}^{cell}+1) \cdot 2^{16}+n_{RNTI}$.

The following are preferred criteria for selecting or inputting the initialization value PBCH DMRS $c_{init}$ for generating the PBCH reference signal:

(1) Unlike LTE Cell Specific Reference Signal (CRS), the initialization value $c_{init}$ for PBCH DRMS is not related to a possible extended cyclical prefix (CP), since only a normal cyclical prefix (CP) is configured for a synchronization signaling (SS) block.

(2) Unlike LTE PDSCH DMRS, initialization value $c_{init}$ is not related to any RNTI, as no RNTI is allocated to the PBCH channel.

(3) PBCH DMRS $c_{init}$ might also be related to any one or combination of the following parameters:
  (3.1) $N_{ID}^{cell}$: physical layer cell identity;
  (3.2) l: the OFDM symbol number within the slot;
  (3.3) $n_s$: the slot number within a radio frame;
  (3.4) $n_{b1}$: the SS block index, either within a SS burst, or within a SS block burst set;
  (3.5) $n_{b2}$: the SS burst index within a SS burst set;
  (3.6): v: starting symbol number within 5 ms SS block transmission time window from a SS burst set.

Figure 9:
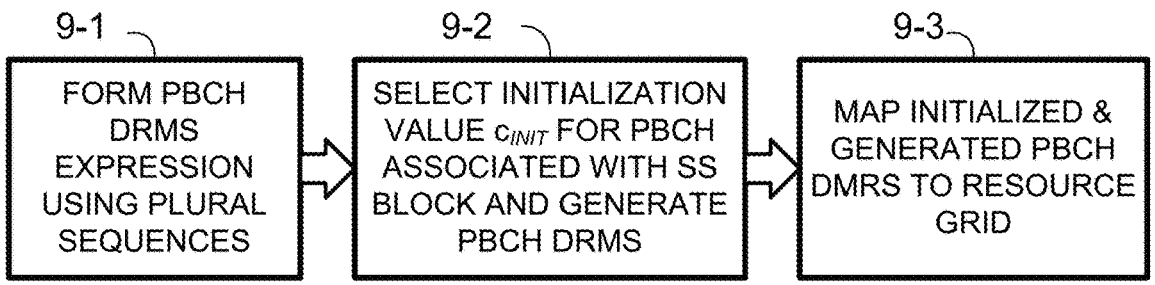
FIG. 9 is a flowchart showing example, non-limiting, representative acts or steps performed in generating a demodulation reference signal for the example embodiment and modes of FIG. 5A and FIG. 5B.

Thus, in general summary of the foregoing, FIG. 9 shows basic, representative, example acts or step included in an act of generating a demodulation reference signal for the Physical Broadcast Channel (PBCH) from which demodulation reference signal a parameter of the radio access network can be determined. Act 9-1 comprises forming an expression for the demodulation transcendent PBCH demodulation reference signal (PBCH DRMS), such as that given by EXPRESSION 1 above, using plural sequences. Act 9-2 comprises selecting/choosing an initialization value ($c_{init}$), based on a value of the network parameter to be expressed, for a selected sequence used to form the PBCH DRMS which is associated with a particular synchronization signal block, and generating the PBCH DRMS using the selected initialization value ($c_{init}$). Act 9-3 comprises mapping the generated PBCH DRMS to a resource grid (e.g., to a frame) in which the PBCH DRMS will be transmitted.

The foregoing thus illustrates general techniques for PBCH DMRS sequence generation. Alternative (3.4) listed above specifically encompasses carrying SS block index information (e.g., index information for the synchronization signal block) in or with PBCH DMR. For example, the generation of PBCH DMRS sequence (e.g., EXPRESSION 1) can be determined by SS block index, so a different PBCH DMRS sequence (based on choice of initialization value) can represent different particular SS block index.

Figure 5B:
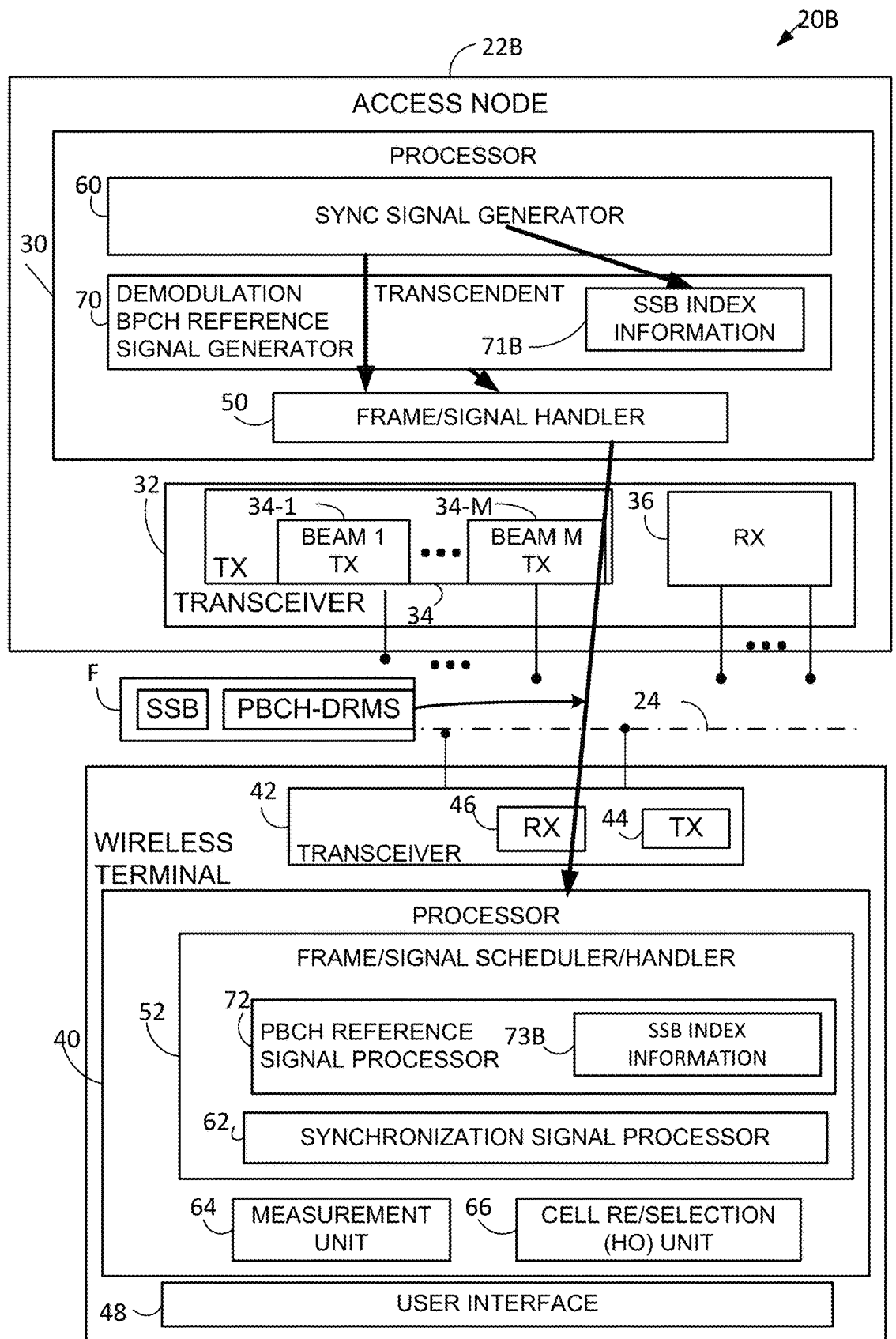

FIG. 5B shows an example embodiment and mode in which the network parameter is or comprises index information for the synchronization signal block. In the example embodiment and mode of FIG. 5B, the BPCH reference signal generator 70 has access to, e.g., a memory which stores block index information for the synchronization signal block, the index information or time index. As explained before, the index information for the synchronization signal block" and "index information" and "time index" are used interchangeably to refer to a mechanism for identifying or distinguishing a certain synchronization signal block, and may include the timing or resource grid-specifying information such as frame/slot/symbol timing.

Figure 7B:
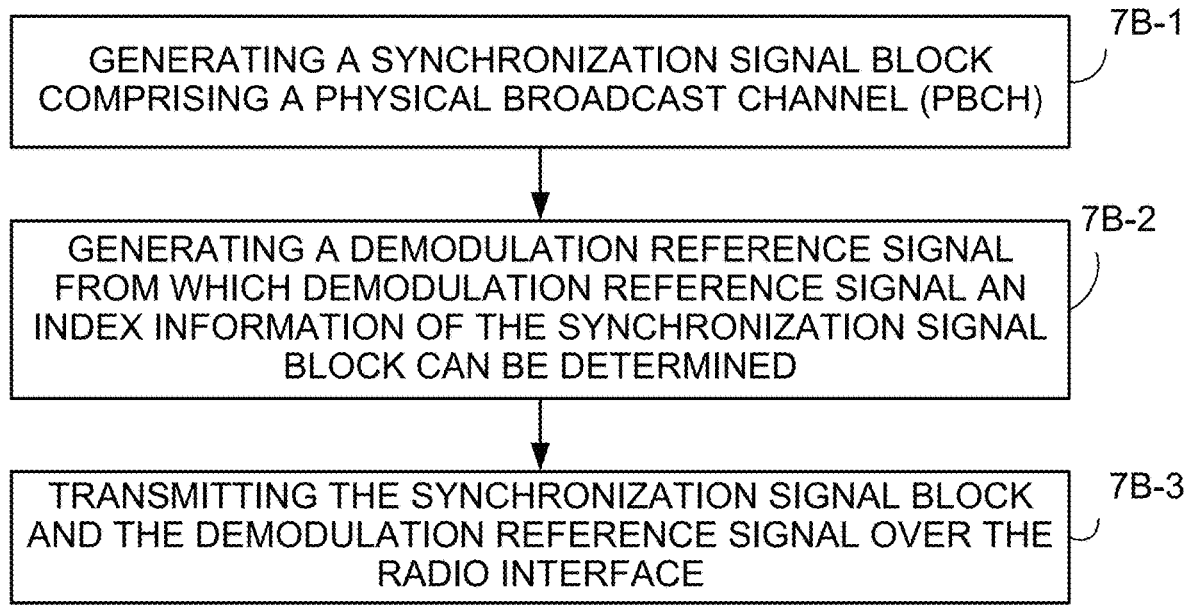

Basic, example acts or steps performed by the radio access node 22B of the example embodiment and mode of FIG. 5B are shown in FIG. 7B and similar to those of FIG. 7A, a difference being that the demodulation reference signal is generated so that the index information for the synchronization signal block can be determined therefrom. In the FIG. 5B example embodiment and mode, the BPCH reference signal generator 70 generates the demodulation transcendent PBCH demodulation reference signal (e.g., PBCH DRMS) in a manner understood with reference to FIG. 9. In particular, as act 9-2 of FIG. 9 the BPCH reference signal generator 70 of radio access node 22B uses index information for the synchronization signal block to be or to select the initialization value $c_{init}$ for a sequence from which the demodulation transcendent PBCH demodulation reference signal is formed. As act 9-2 the demodulation transcendent PBCH demodulation reference signal is mapped to the frame F which is transmitted to the wireless terminal 26B. The BPCH reference signal processor 72 of wireless terminal 26B determines the index information for the synchronization signal block from the PBCH DRMS of the received frame F, by particularly does so by determining the value with which the sequence of the received PBCH DRMS must have been initialized.

Figure 8B:
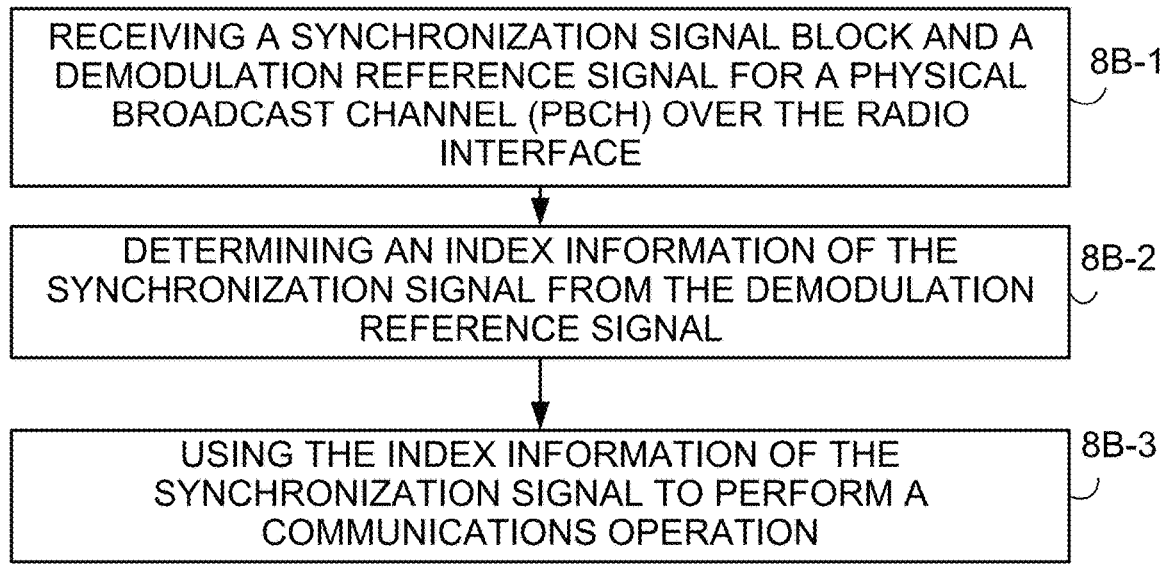

Basic, example acts or steps performed by the wireless terminal 26B of the example embodiment and mode of FIG. 5B are shown in FIG. 8B and similar to those of FIG. 8A, a difference being that the index information for the synchronization signal block is determined or obtained from the demodulation reference signal. That is, the demodulation reference signal for the Physical Broadcast Channel (PBCH) is generated in dependence upon index information for the synchronization signal block, e.g., the demodulation reference signal is generated to be related to the index information for the synchronization signal block.

The example embodiment and mode of FIG. 5B thus provides one specific example implementation of the generic network parameter mode of FIG. 5A. It should be understood that one or more (e.g., a combination) of other network parameters, such as those listed above in the list (3.1) through and including (3.6), may be communicated to the wireless terminal 26 using through choice of initialization value (e.g., $c_{init}$) of a sequence forming the demodulation transcendent PBCH demodulation reference signal.

Choice of initialization value of a sequence used to form the demodulation transcendent PBCH demodulation reference signal is just one technique encompassed herein for providing the demodulation reference signal with a capability to express information transcending modulation properties (e.g., for providing information, such as a network parameter, in addition to the nominal function of facilitating demodulation of the PBCH). In other example embodiment and modes, other techniques such as resource grid mapping of the demodulation reference signal and/or scrambling of the demodulation reference signal may—either alone or in combination with choice of initialization value—provide the additional information, e.g., the one or more network parameters such as (3.1) through (3.6) listed above, including but not limited to the index information for the synchronization signal block described with reference to FIG. 5B.

Figure 5C:
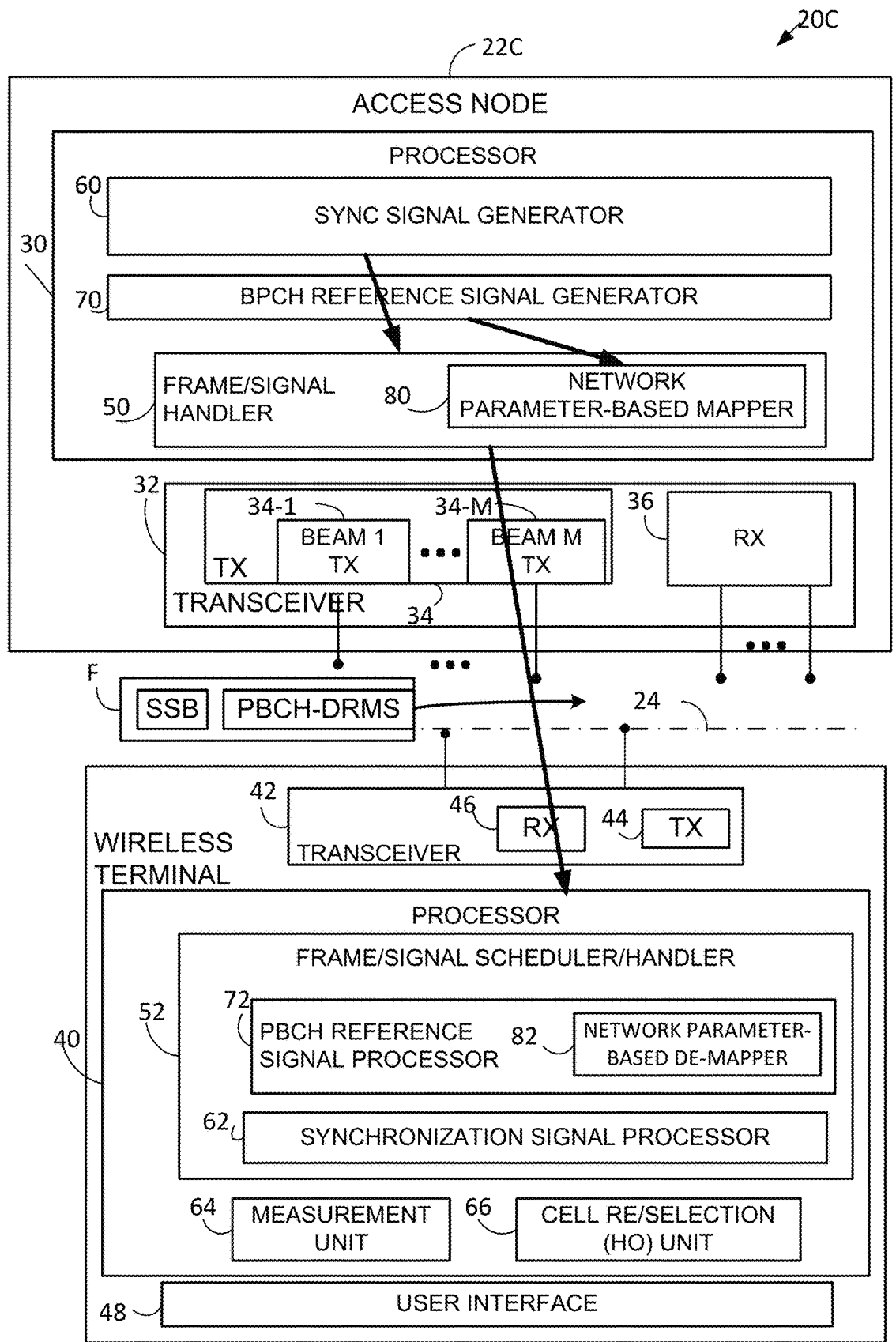

In the example embodiment and mode of FIG. 5C the demodulation reference signal generated by BPCH reference signal generator 70 is mapped by network parameter-based mapper 80 of radio access node 22C to selected resource elements (REs) of the frame F which carries the demodulation reference signal. The BPCH reference signal processor 72 of wireless terminal 26C of FIG. 5C comprises network parameter-based de-mapper 82 which obtains the demodulation reference signal from the frame, and based on the particular resource elements (REs) from which the demodulation reference signal is obtained determines the network parameter.

Figure 7C:
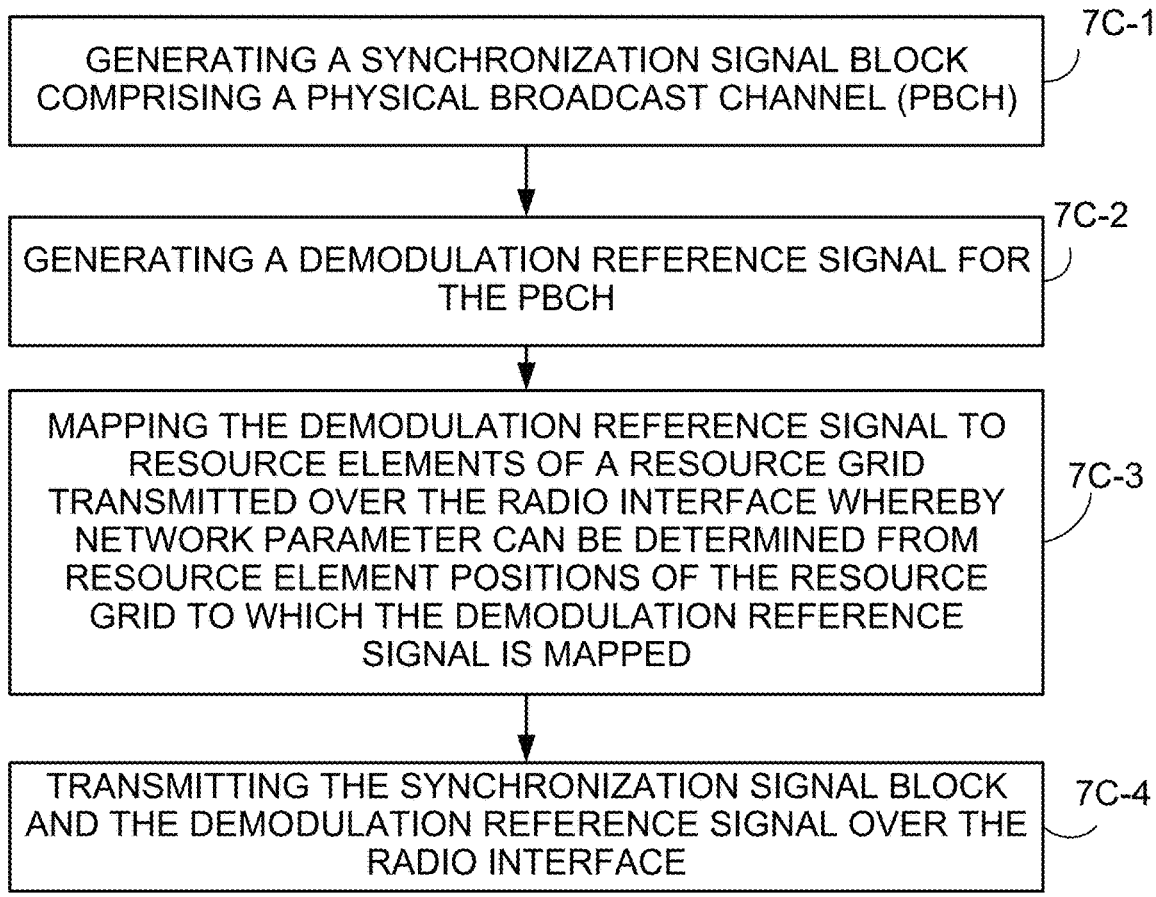

Further, considering whether the NR-SSS participates in the PBCH demodulation, PBCH DMRS sequence mapping to resource elements locations is provided by the example embodiment and mode of FIG. 5C. The PBCH transmission mode and/or PBCH transmission antenna port may also affect the mapping. In addition, when the PBCH DMRS sequence is mapped to the resource elements, sequences of different cells might be mapped to different frequency domain positions, so as to guarantee the positions of neighboring cells PBCH DMRS sequence in frequency domain are orthogonal to each other without interference. In other words, there may be frequency domain shifts when PBCH DMRS sequences are mapped to resource elements. Applying the same rule, there can also be frequency domain shifts due to the fact that different network parameters (e.g., different SS block indices) are associated with the particular SS block. Therefore, different position pattern of PBCH DMRS sequence can also be used to carry the network parameter(s), e.g., SS block index A simple resource element (RE) mapping example (in the frequency domain) for the example embodiment and mode of FIG. 5C is as follows:
- a sequence obtained from RE positions #1, #6, #11, #16→represents cell ID 1 and SS block index 1;
- a sequence obtained from RE positions #2, #7, #12, #17→represents cell ID 1 and SS block index 2;
- a sequence obtained from RE positions #3, #8, #13, #18→represents cell ID 1 and SS block index 3;
- a sequence obtained from RE positions #4, #9, #14, #19→represents cell ID 2 and SS block index 1;
- a sequence obtained from RE positions #5, #10, #15, #20→represents cell ID 2 and SS block index 2;
- a sequence obtained from RE positions #6, #11, #16, #21→represents cell ID 2 and SS block index 3;

Basic, representative acts or steps performed by the radio access node 22C of FIG. 5C are shown in FIG. 7C. Act 7C-1 comprises the node processor 30 generating a synchronization signal block comprising a Physical Broadcast Channel (PBCH). Act 7C-2 comprises the node processor 30 generating a demodulation reference signal for the Physical Broadcast Channel (PBCH) (e.g., PBCH DRMS). Act 7C-3 comprises the network parameter-based mapper 80 mapping the demodulation reference signal to resource elements of a resource grid transmitted over the radio interface whereby a network parameter of the radio access network can be determined at least partially from resource element positions of the resource grid to which the demodulation reference signal is mapped. Act 7C-4 comprises the node transmitter circuitry 34 transmitting the synchronization signal block and the demodulation reference signal (e.g., PBCH DRMS) over the radio interface 24, e.g., for example in frame F as shown in FIG. 5C.

Figure 8C:
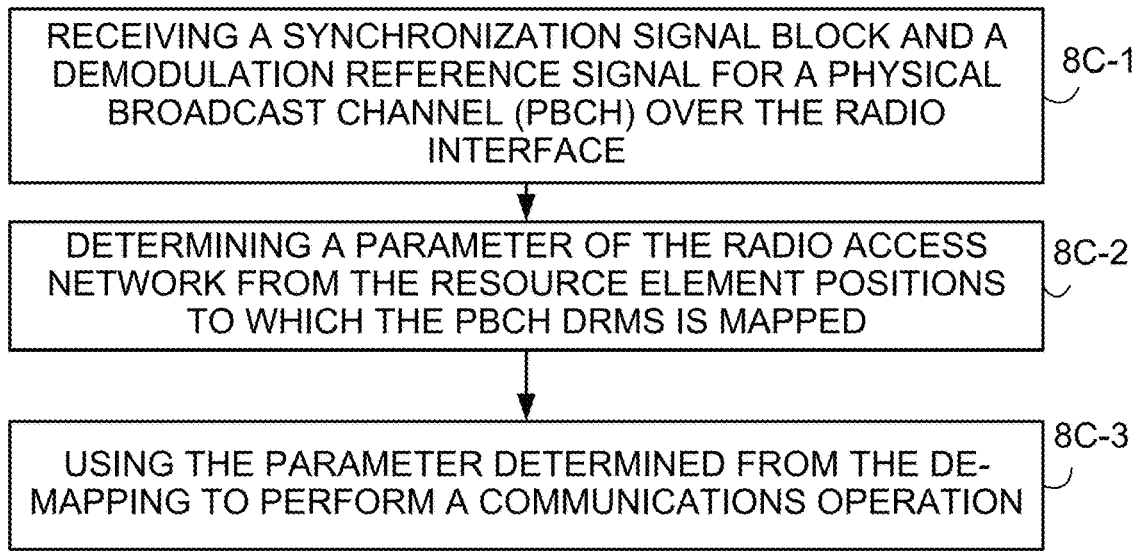

Basic, representative acts or steps performed by the wireless terminal 26C of FIG. 5C are shown in FIG. 8C. Act 8C-1 comprises receiver circuitry 46 receiving a synchronization signal block and a demodulation reference signal for a Physical Broadcast Channel (PBCH) (e.g., PBCH DRMS) over the radio interface 24. Act 8C-2 comprises the terminal processor 40, and particularly the network parameter-based de-mapper 82 of PBCH reference signal processor 72, determining a network parameter of the radio access network at least partially from the particular resource element positions of the resource grid to which the demodulation reference signal is mapped. An optional further act or step, act 8C-3, comprises the wireless terminal 26C using the parameter determined from the de-mapping of the demodulation reference signal to perform a communications operation, such as a signal measurement and possibly even a cell selection/re-selection operation, for example.

In the foregoing discussion of the example embodiment and mode of FIG. 5C it was mentioned that a network parameter of the radio access network may "at least partially" be determined from the particular resource element positions of the resource grid to which the demodulation reference signal is mapped. "At least partially" means that other factors may also influence expression/determination of the network parameter in/from the demodulation reference signal, such as the choice of initialization value of a sequence forming the demodulation reference signal, as discussed above.

In the example embodiment and mode of FIG. 5D scrambling of the demodulation reference signal may—either alone or in combination with choice of initialization value and/or resource element mapping—provide the additional information, e.g., the one or more network parameters such as (3.1) through (3.6) listed above, including but not limited to the index information for the synchronization signal block described with reference to FIG. 5B.

Figure 5D:
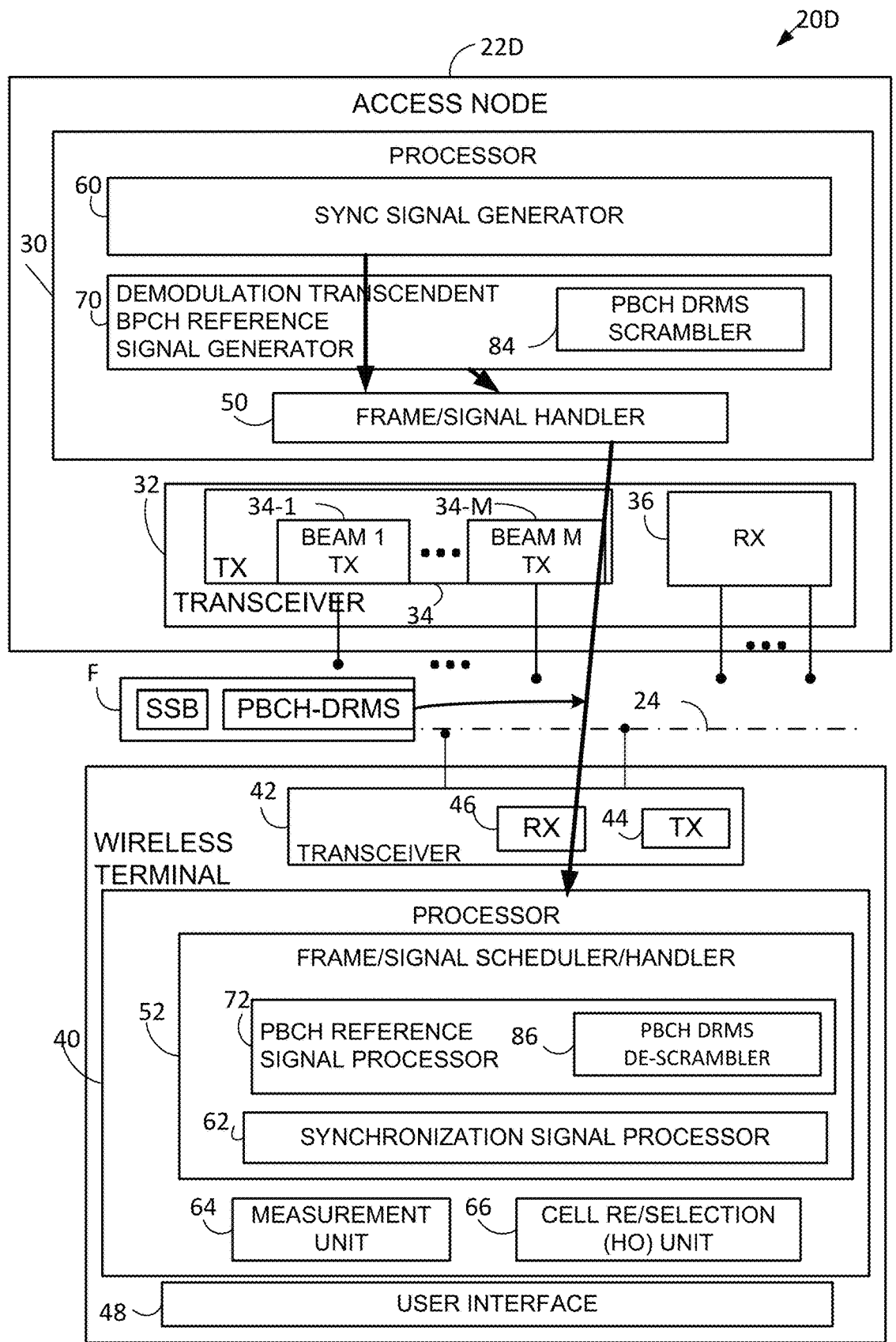

In the example embodiment and mode of FIG. 5D the demodulation reference signal generated by BPCH reference signal generator 70 is scrambled by PBCH DRMS scrambler 84 of radio access node 22D. A particular scrambling sequence chosen by the network parameter-based scrambler 84 to scramble the demodulation reference signal depends on the value of the network parameter which is indicated by the scrambled demodulation reference signal. The BPCH reference signal processor 72 of wireless terminal 26D of FIG. 5D comprises PBCH DRMS de-scrambler 86 which de-scrambles the obtains the demodulation reference signal from the frame. The PBCH DRMS de-scrambler 86 determines the value of the network parameter indicated by the demodulation reference signal based on the particular de-scrambling sequence with which the demodulation reference signal can be descrambled.

Figure 7D:
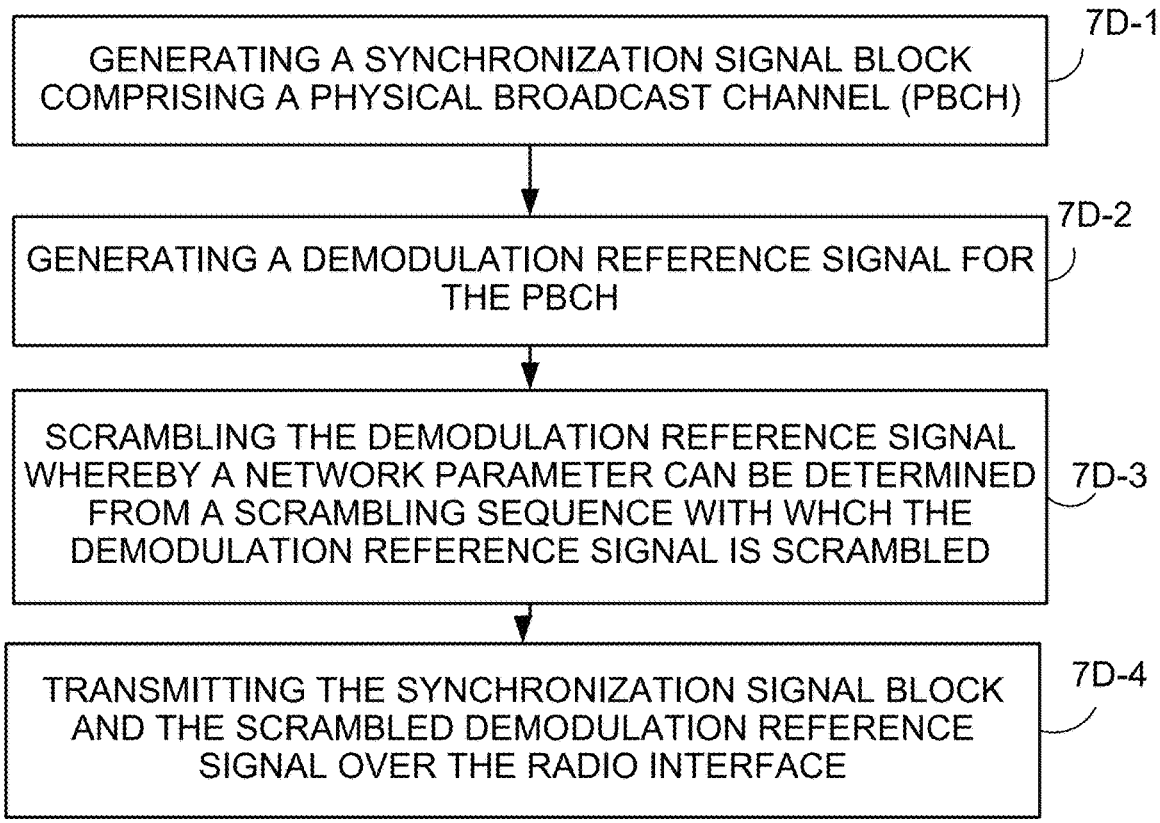

Basic, representative acts or steps performed by the radio access node 22D of FIG. 5D are shown in FIG. 7D. Act 7D-1 comprises the node processor 30 generating a synchronization signal block comprising a Physical Broadcast Channel (PBCH). Act 7D-2 comprises the node processor 30 generating a demodulation reference signal for the Physical Broadcast Channel (PBCH) (e.g., PBCH DRMS). Act 7C-3 comprises the PBCH DRMS scrambler 84 scrambling the demodulation reference signal with a scrambling sequence whereby a network parameter of the radio access network can be determined at least partially from the scrambling sequence used to scramble the demodulation reference signal. Act 7D-4 comprises the node transmitter circuitry 34 transmitting the synchronization signal block and the scrambled demodulation reference signal (e.g., scrambled PBCH DRMS) over the radio interface 24, e.g., for example in frame F as shown in FIG. 5D.

Figure 8D:
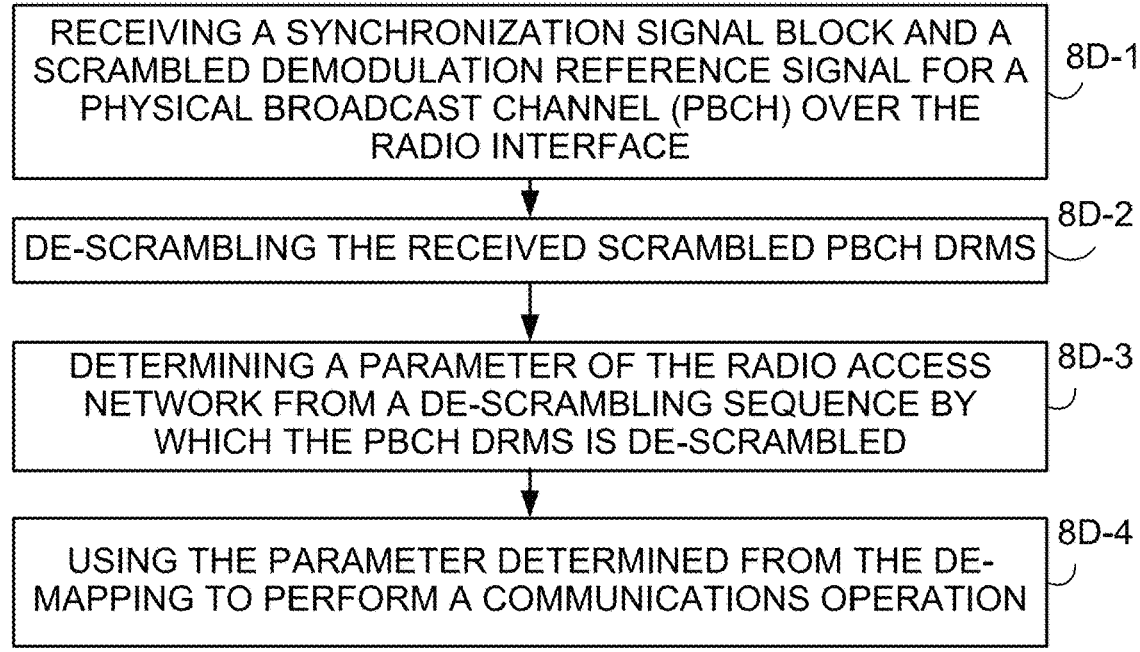

Basic, representative acts or steps performed by the wireless terminal 26D of FIG. 5D are shown in FIG. 8D. Act 8D-1 comprises receiver circuitry 46 receiving a synchronization signal block and a scrambled demodulation reference signal for a Physical Broadcast Channel (PBCH) (e.g., PBCH DRMS) over the radio interface 24. Act 8D-2 comprises the terminal processor 40, and particularly the PBCH DRMS de-scrambler 86 of PBCH reference signal processor 72, de-scrambling the received demodulation reference signal using a de-scrambling sequence which successfully de-scrambles the scrambling demodulation reference signal. Act 8D-3 comprises the terminal processor 40, and particularly PBCH reference signal processor 72, determining a network parameter of the radio access network at least partially based on the de-scrambling sequence which successfully de-scrambles the scrambling demodulation reference signal. An optional further act or step, act 8D-4, comprises the wireless terminal 26D using the parameter determined from the de-scrambling of the demodulation reference signal to perform a communications operation, such as a signal measurement and possibly even a cell selection/re-selection operation, for example.

In the foregoing discussion of the example embodiment and mode of FIG. 5D it was mentioned that a network parameter of the radio access network may "at least partially" be determined from the particular scrambling/de-scrambling sequence that is employed for the demodulation reference signal. "At least partially" means that other factors may also influence determination of the network parameter, such as the choice of initialization value of a sequence forming the demodulation reference signal, and/or the resource element (RE) mapping of FIG. 5C, as discussed above.

Figure 10:
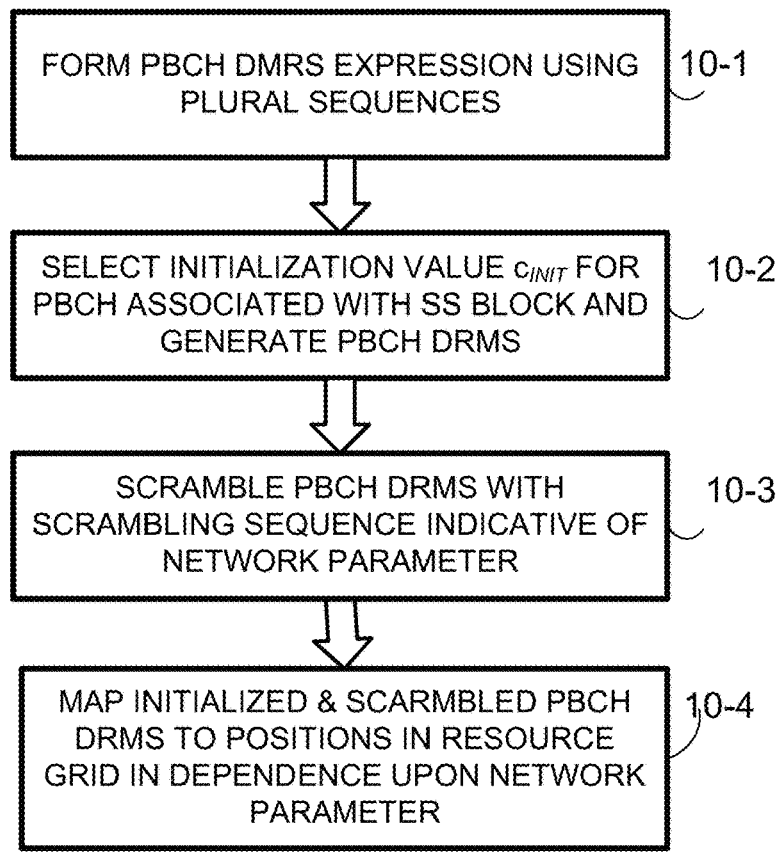
FIG. 10 is a flowchart showing example, non-limiting, representative acts or steps performed in generating, scrambling, and selectively mapping a demodulation reference signal for a combination of the example embodiment and modes of FIG. 5A/FIG. 5B, FIG. 5C, and FIG. 5D.

FIG. 10 shows that two or more of the techniques of example embodiment and modes of FIG. 5A/FIG. 5B, FIG. C, and FIG. 5D may be combined for generating a demodulation reference signal for the Physical Broadcast Channel (PBCH) from which demodulation reference signal a parameter of the radio access network can be determined. Act 10-1 comprises forming an expression for the demodulation transcendent PBCH demodulation reference signal (PBCH DRMS), such as that given by EXPRESSION 1 above, using plural sequences. Act 10-2 comprises at least partially expressing the network parameter by selecting an initialization value ($c_{init}$) for a selected sequence used to form a PBCH DRMS which is associated with a particular synchronization signal block, and generating the PBCH DRMS using the selected initialization value ($c_{init}$), in the manners described above with reference to FIG. 5A and FIG. 5B. Act 10-3 comprises scrambling the generated demodulation reference signal with a scrambling sequence chosen to at least partially express the network parameter, in the manner of the example embodiment and mode of FIG. 5D, for example. Act 10-4 comprises mapping the scrambled demodulation reference signal to particular resource elements (REs), the pattern of the mapped REs being such as to at least partially express the network parameter.

In the foregoing discussion of the example embodiment and mode of FIG. 10 it was again mentioned that a network parameter of the radio access network may "at least partially" be determined from, e.g., the choice of initialization value, from the particular scrambling/de-scrambling sequence that is employed for the demodulation reference signal, and from the mapping pattern employed for mapping the demodulation reference signal to the resource grid (e.g., frame). As indicated above, "at least partially" means that more than one factor may influence expression and/or determination of the network parameter, such as two or more of choice of initialization value, scrambling sequence, and mapping pattern. Thus, for example, a same particular initialization value $c_{initi-example}$ may be used to express plural different network parameters, as the same initialization value $c_{initi-example}$ would be used in act 10-3 with different scrambling sequences, and in act 10-4 with different mapping patterns, so that many network parameters could be expressed in the demodulation reference signal based on the same particular initialization value $c_{initi-example}$. However, the combination of other factors and techniques, e.g., scrambling sequence and mapping patterns, results in a unique network parameter being ascertained with reference to a received demodulation reference signal.

It should further understood that not all example embodiment and modes and techniques described above need be combined when a combination is desired, but that for a combination any two such example embodiment and modes/techniques may be combined (e.g., choice of initialization value and scrambling sequence, choice of initialization value and mapping pattern, scrambling sequence and mapping pattern, etc.).

As in different frequency range, the required bit numbers to represent at least SS block index information within a SS burst set are 2, 3 and 6 respectively. Therefore, in different frequency ranges, the same or different alternative design methods might be used; or in some frequency range, some combination of the abovementioned alternative design methods might be used to decrease complexity of obtaining the network parameter (e.g., SS block index information, e.g., some method might deliver LSB information bits part of SS block index, and some method might deliver MSB information bits part of SS block index). Furthermore, any one, or two, or three combinations of abovementioned alternative design methods might be combined with PBCH channel itself (implicitly or explicitly) to deliver the network parameter (e.g., SS block index information), e.g., PBCH payload explicitly delivers MSB information bits part of the network parameter (e.g., SS block index), while any one, or two, or three combinations of abovementioned alternative design methods might deliver LSB information bits part of network parameter (e.g., SS block index) or vice versa.

Moreover, in an LTE system, the system frame number (SFN) information is also carried by PBCH, where PBCH payload carries part of SFN (explicit 7 bits), and a scrambling sequence carries implicitly 3 bits. In a New Radio system, the abovementioned alternative designs to carry a network parameter (e.g., SS block index information) with PBCH DMRS sequence can also be applicable to carrying SFN information.

Figure 11:
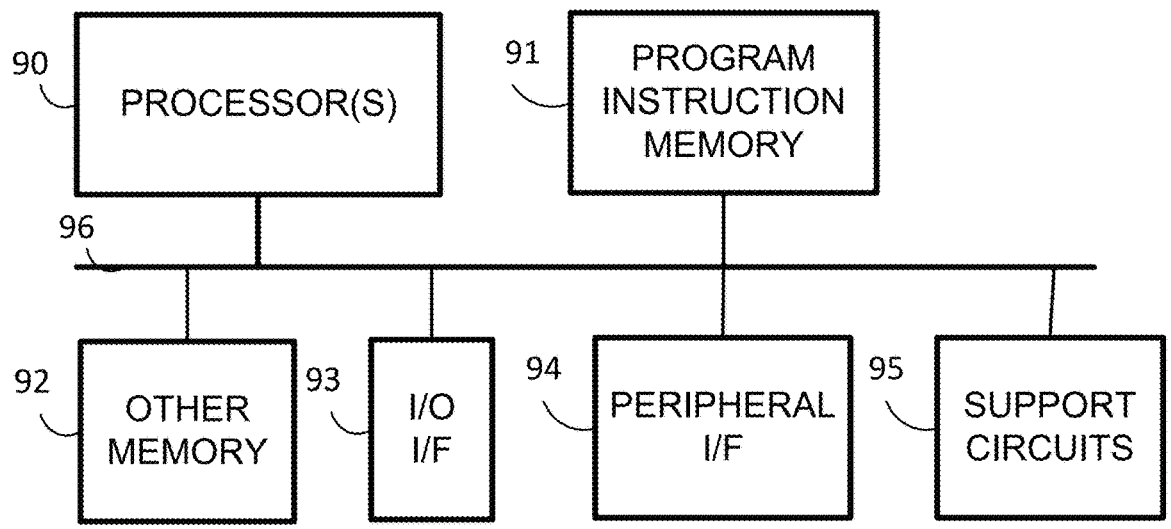
FIG. 11 is a diagrammatic view showing example electronic machinery which may comprise node electronic machinery or terminal electronic machinery.

Certain units and functionalities of node 22 and wireless terminal 26 are, in example embodiments, implemented by electronic machinery, computer, and/or circuitry. For example, the node processors 30 and terminal processors 40 of the example embodiments herein described and/or encompassed may be comprised by the computer circuitry of FIG. 11. FIG. 11 shows an example of such electronic machinery or circuitry, whether node or terminal, as comprising one or more processor(s) circuits 90, program instruction memory 91; other memory 92 (e.g., RAM, cache, etc.); input/output interfaces 93; peripheral interfaces 94; support circuits 95; and busses 96 for communication between the aforementioned units.

The program instruction memory 91 may comprise coded instructions which, when executed by the processor(s), perform acts including but not limited to those described herein. Thus is understood that each of node processor 30 and terminal processor 40, for example, comprise memory in which non-transient instructions are stored for execution.

The memory, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 95 may be coupled to the processors 90 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture. The instructions of such software are stored on non-transient computer readable media.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

It will be appreciated that the technology disclosed herein is directed to solving radio communications-centric issues and is necessarily rooted in computer technology and overcomes problems specifically arising in radio communications. Moreover, in at least one of its aspects the technology disclosed herein improves the functioning of the basic function of a wireless terminal and/or node itself so that, for example, the wireless terminal and/or node can operate more effectively by prudent and efficient use of radio resources. For example, the technology disclosed herein overcomes inefficiencies in telecommunications operations by using a reference signal associated with the Physical Broadcast Channel (PBCH) for plural purposes, e.g., for a purpose beyond PBCH demodulation, with a result that additional information can be more quickly obtained and utilized for further communication operations such as cell selection, cell re-selection, and handover.

The technology disclosed herein includes but is not limited to the following example embodiments and modes.

Example Embodiment 1

A node of a radio access network comprising:
processor circuitry configured to generate:
a synchronization signal block comprising a Physical Broadcast Channel (PBCH);
a demodulation reference signal for the Physical Broadcast Channel (PBCH) from which demodulation reference signal a parameter of the radio access network can be determined; and,
transmitter circuitry configured to transmit the synchronization signal block and the demodulation reference signal over a radio interface.

Example Embodiment 2

The node of Example Embodiment 1, wherein the processor is configured to generate the synchronization signal block to comprise the demodulation reference signal.

Example Embodiment 3

The node of Example Embodiment 1, wherein the processor circuitry is configured to generate the demodulation reference signal to comprise at least one sequence which is initialized with an initialization value that facilitates derivation of the parameter of the radio access network.

Example Embodiment 4

The node of Example Embodiment 3, wherein the sequence comprises plural m-sequences, and wherein the processor is configured to initialize at least one of the plural m-sequences with the initialization value that facilitates the network parameter being determined from the demodulation reference signal.

Example Embodiment 5

The node of Example Embodiment 4, wherein the sequence is a Gold sequence which comprises the plural sequences.

Example Embodiment 6: The node of Example Embodiment 3, wherein the processor is further configured to map the demodulation reference signal to resource element(s) of a resource grid transmitted over the radio interface whereby the network parameter can be determined from a combination of the initialization value and resource element position(s) of the resource grid to which the demodulation reference signal is mapped.

Example Embodiment 7

The node of Example Embodiment 3, wherein the processor is further configured to scramble the demodulation reference signal with a scrambling sequence whereby the network parameter can be determined from a combination of the initialization value and the scrambling sequence.

Example Embodiment 8

The node of Example Embodiment 3, wherein the processor is further configured:
to map the demodulation reference signal to resource element(s) of a resource grid transmitted over the radio interface; and
to scramble the demodulation reference signal with a scrambling sequence whereby the network parameter can be determined from a combination of the initialization value, resource element position(s) of the resource grid to which the demodulation reference signal is mapped; and the scrambling sequence.

Example Embodiment 9

The node of Example Embodiment 3, wherein the initialization value is related to one or more of the following:
physical layer cell identity (PCID);
OFDM symbol number within a slot;
slot number within a radio frame;
timing index of one or more of a synchronization signal block, a synchronization signal block burst, and a synchronization signal block burst set;
a synchronization signal block burst index within a synchronization signal block burst set; and
a starting symbol number within a 5 ms synchronization signal block transmission time window from a synchronization signal block burst set.

Example Embodiment 10

A method in a node of a radio access network comprising:
using processor circuitry to generate:
a synchronization signal block comprising a Physical Broadcast Channel (PBCH);
a demodulation reference signal for the Physical Broadcast Channel (PBCH) from which demodulation reference signal a parameter of the radio access network can be determined; and,
transmitting the synchronization signal block and the demodulation reference signal over a radio interface.

Example Embodiment 11

A wireless terminal which communicates over a radio interface with an access node of a radio access network, the wireless terminal comprising:
receiver circuitry for receiving a synchronization signal block and a demodulation reference signal for a Physical Broadcast Channel (PBCH) over a radio interface;
processor circuitry configured to determine a parameter of the radio access network from the demodulation reference signal.

Example Embodiment 12

The wireless terminal of Example Embodiment 11, wherein the processor circuitry is configured to determine from the demodulation reference signal at least one sequence which is initialized with an initialization value that is related to the parameter of the radio access network.

Example Embodiment 13

The wireless terminal of Example Embodiment 12, wherein the sequence comprises plural m-sequences, and wherein the processor is configured to determine for at least one of the plural m-sequences the initialization value that is related to the parameter of the radio access network.

Example Embodiment 14

The wireless terminal of Example Embodiment 13, wherein the sequence is a Gold sequence which comprises the plural sequences.

Example Embodiment 15

The wireless terminal of Example Embodiment 12, wherein the processor is further configured to obtain the demodulation reference signal from resource element(s) of a resource grid transmitted over the radio interface whereby the network parameter can be determined from a combination of the initialization value and resource element position(s) of the resource grid to which the demodulation reference signal is mapped.

Example Embodiment 16

The wireless terminal of Example Embodiment 12, wherein the processor is further configured to de-scramble the demodulation reference signal with a scrambling sequence whereby the network parameter can be determined from a combination of the initialization value and the scrambling sequence.

Example Embodiment 17

The wireless terminal of Example Embodiment 12, wherein the processor is further configured:
to obtain the demodulation reference signal from resource element(s) of a resource grid transmitted over the radio interface; and
to de-scramble the demodulation reference signal with a scrambling sequence whereby the network parameter can be determined from a combination of the initialization value, resource element position(s) of the resource grid to which the demodulation reference signal is mapped; and the de-scrambling sequence.

Example Embodiment 18

The wireless terminal of Example Embodiment 12, wherein the initialization value is related to one or more of the following:
physical layer cell identity (PCID);
OFDM symbol number within a slot;
slot number within a radio frame;
timing index of one or more of a synchronization signal block, a synchronization signal block burst, and a synchronization signal block burst set;
a synchronization signal block burst index within a synchronization signal block burst set; and
a starting symbol number within a 5 ms synchronization signal block transmission time window from a synchronization signal block burst set.

Example Embodiment 19

A method in a wireless terminal which communicates over a radio interface with an access node of a radio access network, the method comprising:
receiving a synchronization signal block and a demodulation reference signal for a Physical Broadcast Channel (PBCH) over a radio interface;
using processor circuitry to determine a parameter of the radio access network from the demodulation reference signal.

Example Embodiment 20

A node of a radio access network comprising:
processor circuitry configured to generate:
a synchronization signal block comprising a Physical Broadcast Channel (PBCH);
a demodulation reference signal for the Physical Broadcast Channel (PBCH) from which demodulation reference signal an index information for the synchronization signal block can be determined; and,
transmitter circuitry configured to transmit the synchronization signal block and the demodulation reference signal over a radio interface.

Example Embodiment 21

The node of Example Embodiment 20, wherein the index information for the synchronization signal block identifies timing information for the synchronization signal block.

Example Embodiment 22

The node of Example Embodiment 20, wherein the processor is configured to generate the synchronization signal block to comprise the demodulation reference signal.

Example Embodiment 23

The node of Example Embodiment 20, wherein the processor is configured to generate the demodulation reference signal comprising at least one sequence and to initialize the at least one sequence with an initialization value that facilitates the index information for the synchronization signal block being determined from the demodulation reference signal.

Example Embodiment 24

The node of Example Embodiment 23, wherein the sequence comprises plural m-sequences, and wherein the processor is configured to initialize at least one of the plural m-sequences with the initialization value that facilitates the index information for the synchronization signal block being determined from the demodulation reference signal.

Example Embodiment 25

The node of Example Embodiment 24, wherein the sequence is a Gold sequence which comprises the plural sequences.

Example Embodiment 26

The node of Example Embodiment 23, wherein the processor is further configured to map the demodulation reference signal to resource elements of a resource grid transmitted over the radio interface whereby the index information for the synchronization signal block can be determined from a combination of the initialization value and resource element positions of the resource grid to which the demodulation reference signal is mapped.

Example Embodiment 27

The node of Example Embodiment 23, wherein the processor is further configured to scramble the demodulation reference signal with a scrambling sequence whereby the index information for the synchronization signal block can be determined from a combination of the initialization value and the scrambling sequence.

Example Embodiment 28

A method in a node of a radio access network comprising:
using processor circuitry configured to generate:
a synchronization signal block comprising a Physical Broadcast Channel (PBCH);
a demodulation reference signal for the Physical Broadcast Channel (PBCH) from which demodulation reference signal an index information for the synchronization signal block can be determined; and,
transmitting the synchronization signal block and the demodulation reference signal over a radio interface.

Example Embodiment 29

A wireless terminal which communicates over a radio interface with an access node of a radio access network, the wireless terminal comprising:
receiver circuitry for receiving a synchronization signal block and a demodulation reference signal for a Physical Broadcast Channel (PBCH) over a radio interface;
processor circuitry configured to determine an index information for the synchronization signal block from the demodulation reference signal.

Example Embodiment 30

A method in a wireless terminal which communicates over a radio interface with an access node of a radio access network, the method comprising:
receiving a synchronization signal block and a demodulation reference signal for a Physical Broadcast Channel (PBCH) over a radio interface;
using processor circuitry to determine an index information for the synchronization signal block from the demodulation reference signal.

Example Embodiment 31

A node of a radio access network comprising:
processor circuitry configured:
to generate a synchronization signal block comprising a Physical Broadcast Channel (PBCH);
to generate a demodulation reference signal for the Physical Broadcast Channel (PBCH);
to map the demodulation reference signal to resource elements of a resource grid transmitted over the radio interface whereby a parameter of the radio access network can be determined from resource element positions of the resource grid to which the demodulation reference signal is mapped; and
transmitter circuitry configured to transmit the synchronization signal block and the demodulation reference signal over a radio interface.

Example Embodiment 32

A method in a node of a radio access network comprising:
using processor circuitry to:
generate a synchronization signal block comprising a Physical Broadcast Channel (PBCH);
generate a demodulation reference signal for the Physical Broadcast Channel (PBCH);
map the demodulation reference signal to resource elements of a resource grid transmitted over the radio interface whereby a network parameter of the radio access network can be determined at least partially from resource element positions of the resource grid to which the demodulation reference signal is mapped; and
transmitting the synchronization signal block and the demodulation reference signal over a radio interface.

Example Embodiment 33

A wireless terminal which communicates over a radio interface with an access node of a radio access network, the wireless terminal comprising:
receiver circuitry for receiving a synchronization signal block and a demodulation reference signal for a Physical Broadcast Channel (PBCH) over a radio interface;
processor circuitry configured to determine a parameter of the radio access network at least partially from resource element positions of the resource grid to which the demodulation reference signal is mapped.

Example Embodiment 34

A method in a wireless terminal of a radio access network comprising:
receiving a synchronization signal block and a demodulation reference signal for a Physical Broadcast Channel (PBCH) over a radio interface;
using processor circuitry to determine a parameter of the radio access network at least partially from resource element positions of the resource grid to which the demodulation reference signal is mapped.

Example Embodiment 35

A node of a radio access network comprising:
processor circuitry configured:
to generate a synchronization signal block comprising a Physical Broadcast Channel (PBCH);
to generate a demodulation reference signal for the Physical Broadcast Channel (PBCH);
to scramble the demodulation reference signal with a scrambling sequence whereby a network parameter can be determined from the scrambling sequence; and
transmitter circuitry configured to transmit the synchronization signal block and the demodulation reference signal over a radio interface.

Example Embodiment 36

A method in a node of a radio access network, the method comprising:
using processor circuitry:
to generate a synchronization signal block comprising a Physical Broadcast Channel (PBCH);
to generate a demodulation reference signal for the Physical Broadcast Channel (PBCH);

to de-scramble the demodulation reference signal with a de-scrambling sequence whereby a network parameter can be determined from the de-scrambling sequence; and transmitting the synchronization signal block and the demodulation reference signal over a radio interface.

Example Embodiment 37

A wireless terminal which communicates over a radio interface with an access node of a radio access network, the wireless terminal comprising:
receiver circuitry for receiving a synchronization signal block and a demodulation reference signal for a Physical Broadcast Channel (PBCH) over a radio interface;
processor circuitry configured to:
descramble the demodulation reference signal using a de-scrambling sequence;
determine a parameter of the radio access network at least partially based on the particular de-scrambling sequence by which the demodulation reference signal is descrambled.

Example Embodiment 38

A method in a wireless terminal which communicates over a radio interface with an access node of a radio access network, the method comprising:
receiving a synchronization signal block and a demodulation reference signal for a Physical Broadcast Channel (PBCH) over a radio interface;
using processor circuitry to:
descramble the demodulation reference signal using a de-scrambling sequence;
determine a parameter of the radio access network at least partially based on the particular de-scrambling sequence by which the demodulation reference signal is descrambled.

Example Embodiment 39

A user equipment comprising:
a receiver circuitry configured to receive bitmap information indicating, within a measurement window, time domain positions of a synchronization signal block (SSB) used for an intra and/or an inter-frequency measurement, the SSB comprising, at least, a primary synchronization signal (PSS) and a secondary synchronization signal (SSS) and a physical broadcast channel (PBCH), wherein the bitmap information is a bit string, and different length of the bit string is defined for different frequency band.

Example Embodiment 40

A method in a user equipment comprising:
receiving bitmap information indicating, within a measurement window, time domain positions of a synchronization signal block (SSB) used for an intra and/or an inter-frequency measurement, the SSB comprising, at least, a primary synchronization signal (PSS) and a secondary synchronization signal (SSS) and a physical broadcast channel (PBCH), wherein the bitmap information is a bit string, and different length of the bit string is defined for different frequency band.

Example Embodiment 41

An access node of a radio access network, comprising:
transmitting circuitry configured to transit, over a radio interface to at least one user equipment, receive bitmap information indicating, within a measurement window, time domain positions of a synchronization signal block (SSB) used for an intra and/or an inter-frequency measurement, the SSB comprising, at least, a primary synchronization signal (PSS) and a secondary synchronization signal (SSS) and a physical broadcast channel (PBCH), wherein the bitmap information is a bit string, and different length of the bit string is defined for different frequency band.

Example Embodiment 42

A method in an access node of a radio access network, the method comprising:
transmitting, over a radio interface to at least one user equipment, bitmap information indicating, within a measurement window, time domain positions of a synchronization signal block (SSB) used for an intra and/or an inter-frequency measurement, the SSB comprising, at least, a primary synchronization signal (PSS) and a secondary synchronization signal (SSS) and a physical broadcast channel (PBCH), wherein the bitmap information is a bit string, and different length of the bit string is defined for different frequency band Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:
1. A base station apparatus comprising:
processor circuitry configured to generate a block including at least a primary synchronization signal (PSS), a secondary synchronization signal (SSS), a physical broadcast channel (PBCH), and a demodulation reference signal for the PBCH, a reference signal sequence of the demodulation reference signal being generated based on a pseudo-random sequence which is initialized with a value, and the value being determined based on (a) a physical layer cell identity (PCID) and (b) an index of the block; and transmitter circuitry configured to transmit the block.

2. A method of a base station apparatus comprising:

generating a block including at least a primary synchronization signal (PSS), a secondary synchronization signal (SSS), a physical broadcast channel (PBCH), and a demodulation reference signal for the PBCH, a reference signal sequence of the demodulation reference signal being generated based on a pseudo-random sequence which is initialized with a value, and the value being determined based on (a) a physical layer cell identity (PCID) and (b) an index of the block; and transmitting the block.

3. A user equipment comprising:

receiver circuitry configured to receive a block including at least a primary synchronization signal (PSS), a secondary synchronization signal (SSS), a physical broadcast channel (PBCH), and a demodulation reference signal for the PBCH, a reference signal sequence of the demodulation reference signal being generated based on a pseudo-random sequence which is initialized with a value; and processor circuitry configured to determine the value based on (a) a physical layer cell identity (PCID) and (b) an index of the block.

4. A method of a user equipment, the method comprising:

receiving a block including at least a primary synchronization signal (PSS), a secondary synchronization signal (SSS), a physical broadcast channel (PBCH), and a demodulation reference signal for the PBCH, a reference signal sequence of the demodulation reference signal being generated based on a pseudo-random sequence which is initialized with a value; and determining the value based on (a) a physical layer cell identity (PCID) and (b) an index of the block.

* * * * *